(12) United States Patent
Kogiso et al.

(10) Patent No.: US 11,196,723 B2
(45) Date of Patent: Dec. 7, 2021

(54) ENCRYPTED CONTROL SYSTEM, ENCRYPTED CONTROL METHOD, AND ENCRYPTED CONTROL PROGRAM

(71) Applicant: THE UNIVERSITY OF ELECTRO-COMMUNICATIONS, Chofu (JP)

(72) Inventors: Kiminao Kogiso, Chofu (JP); Takashi Suzuki, Chofu (JP)

(73) Assignee: THE UNIVERSITY OF ELECTRO-COMMUNICATIONS, Tokyo (JP)

( * ) Notice: Subject to any disclaimer, the term of this patent is extended or adjusted under 35 U.S.C. 154(b) by 10 days.

(21) Appl. No.: 16/756,159

(22) PCT Filed: Oct. 19, 2018

(86) PCT No.: PCT/JP2018/038954
§ 371 (c)(1),
(2) Date: Apr. 15, 2020

(87) PCT Pub. No.: WO2019/078343
PCT Pub. Date: Apr. 25, 2019

(65) Prior Publication Data
US 2020/0280545 A1    Sep. 3, 2020

(30) Foreign Application Priority Data
Oct. 20, 2017  (JP) .............................. JP2017-203513

(51) Int. Cl.
*H04L 29/06*    (2006.01)
*H04L 9/06*    (2006.01)
*H04L 9/14*    (2006.01)

(52) U.S. Cl.
CPC ........ *H04L 63/0435* (2013.01); *H04L 9/0656* (2013.01); *H04L 63/0876* (2013.01);
(Continued)

(58) Field of Classification Search
CPC .............. H04L 63/0435; H04L 9/0656; H04L 63/0876; H04L 63/10; H04L 2463/121;
(Continued)

(56) References Cited

U.S. PATENT DOCUMENTS 9,100,657 B1 *   8/2015   Jia .......................... H04N 19/87
9,137,528 B1 *   9/2015   Wu ........................ H04N 19/00
(Continued)

FOREIGN PATENT DOCUMENTS

EP         2677680 A1    12/2013
JP     H01-212041 A     8/1989
(Continued)

OTHER PUBLICATIONS

Dec. 25, 2018 International Search Report issued in International Patent Application No. PCT/JP2018/038954.
(Continued)

*Primary Examiner* — Tu T Nguyen
(74) *Attorney, Agent, or Firm* — Oliff PLC

(57) ABSTRACT

An encrypted control system, an encrypted control method, and an encrypted control program make it possible to further reduce a risk of a cipher key leaking. An input device, a plant-side control device, and a controller are respectively equipped with pseudorandom number calculation units having a common function, are time synchronized, and start a synchronized operation at the same time. Since the encrypted control system is configured in such a manner, it becomes possible to switch a pair of a public key and a private key in synchronization with a control cycle of the entire control system. Consequently, it becomes possible to instantaneously and definitely detect intervention in the control system by a malicious third party.

4 Claims, 14 Drawing Sheets

(52) U.S. Cl.
CPC ................ *H04L 63/10* (2013.01); *H04L 9/14* (2013.01); *H04L 2463/121* (2013.01)

(58) Field of Classification Search
CPC ..... H04L 9/14; H04L 63/0442; H04L 9/0825; G09C 1/00
USPC ........................................................ 713/171
See application file for complete search history.

(56) References Cited

U.S. PATENT DOCUMENTS

| | | | | |
|---|---|---|---|---|
| 2013/0283332 | A1* | 10/2013 | Uehara | G10H 1/368 725/116 |
| 2014/0331338 | A1* | 11/2014 | Serita | G06F 21/6227 726/30 |
| 2018/0089416 | A1 | 3/2018 | Rooyakkers et al. | |

FOREIGN PATENT DOCUMENTS

| | | |
|---|---|---|
| JP | 2016-90884 A | 5/2016 |
| JP | 2016-527844 A | 9/2016 |
| WO | 2013/189783 A1 | 12/2013 |

OTHER PUBLICATIONS

Takahiro Fujita et al. "Encryption of Controllers Using Elgamal Cryptosystem." Transactions of the Society of Instrument and Control Engineers, Sep. 30, 2015, vol. 51, No. 9, pp. 661-666.

Takashi Suzuki et al. "Encrypted Control System With Selective Keys." Proceedings of the 60th Japan Joint Automatic Control Conference, Nov. 10, 2017, SaC3-3, [retrieval date Dec. 6, 2018], <URL:https://www.jstage.jst.go.jp/article/jacc/60/0/60_513/_article/-char/ja>.

* cited by examiner

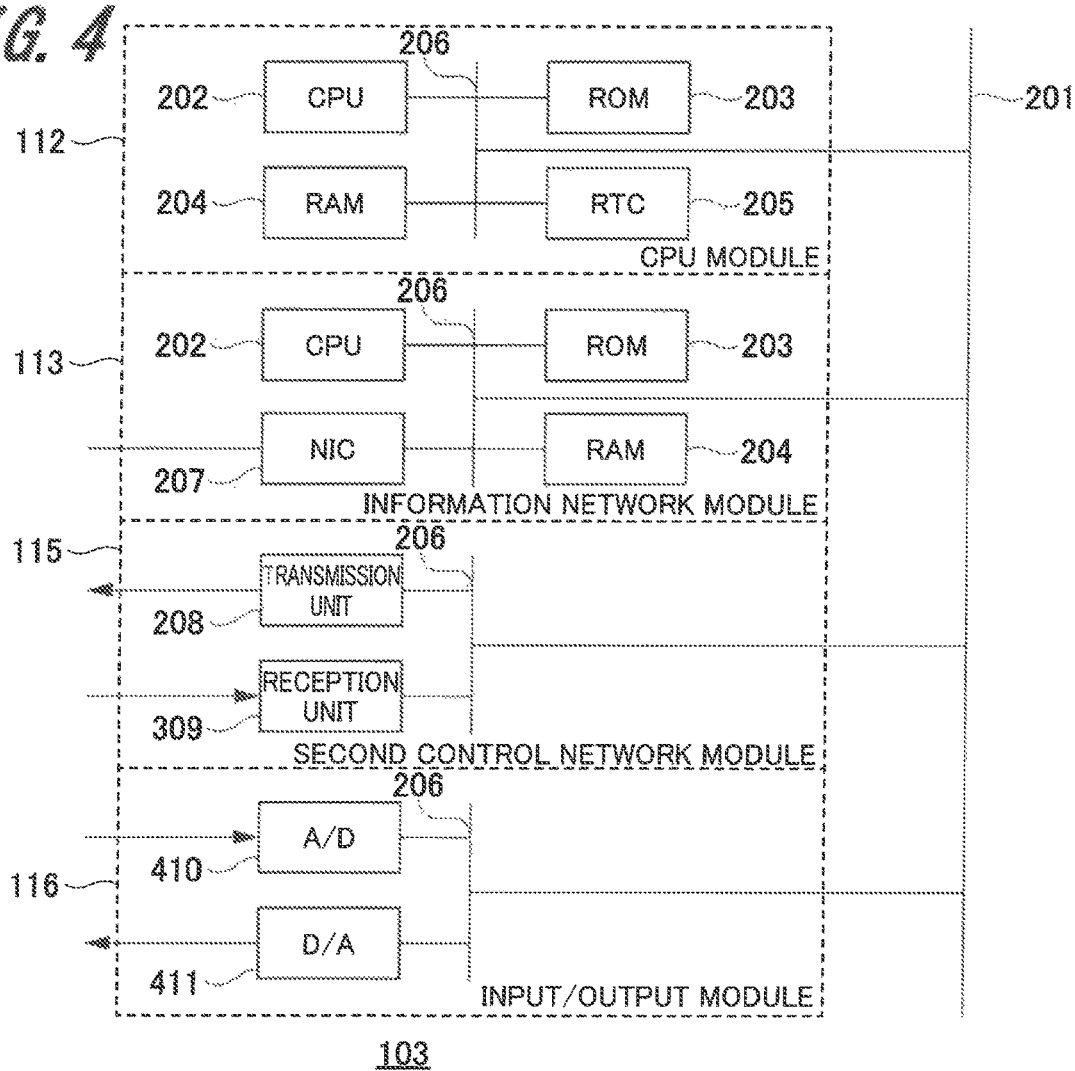
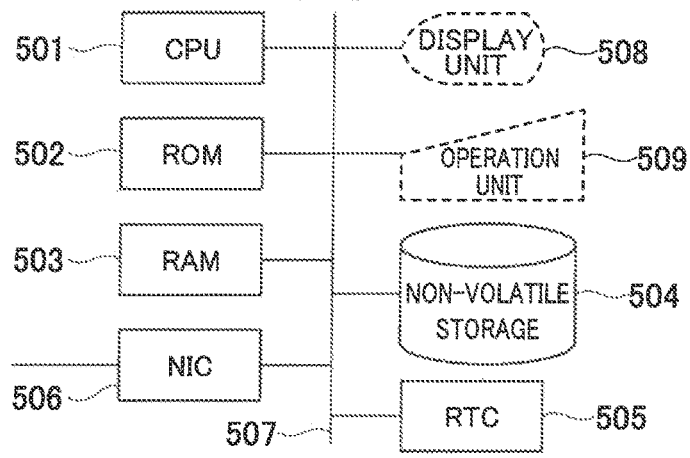

618 PUBLIC KEY TABLE

| RECORD NUMBER (LABEL) | PUBLIC KEY | PRIVATE KEY |
|---|---|---|
| 1 | | |
| 2 | | |

⋮

604 PUBLIC KEY SUB-TABLE

| RECORD NUMBER (LABEL) | PUBLIC KEY |
|---|---|
| 1 | |
| 2 | |

⋮

609 ENCRYPTED PARAMETER TABLE

| RECORD NUMBER (LABEL) | ENCRYPTED FIRST PARAMETER (Enc($K_p$)) | ENCRYPTED SECOND PARAMETER (Enc($K_i$)) | ENCRYPTED THIRD PARAMETER (Enc($K_d$)) |
|---|---|---|---|
| 1 | | | |
| 2 | | | |

ENCRYPTED CONTROL SYSTEM, ENCRYPTED CONTROL METHOD, AND ENCRYPTED CONTROL PROGRAM

TECHNICAL FIELD

The present invention relates to an encrypted control system, an encrypted control method, and an encrypted control program.

BACKGROUND ART

Recently, along with development of information technology such as the Internet, networking to which the information technology is applied is in progress in a control system that controls an infrastructure, which supports national life, such as electricity, gas, or water or industrial facilities such as a factory and a power plant. With such networking of a control system and progress in information and communication technology (ICT), the control system receives tremendous benefits such as improvement in processing speed and advancement of processing contents. On the other hand, there is a concern that a new threat of a cyber attack is introduced in the networking of a control system. In fact, a cyber attack on a control system that monitors or controls a plant operation in a power plant or a factory has appeared, and is attracting attention as a socially important problem.

With such a background, there is an urgent need to develop a technology to protect a control system that supports an important infrastructure from a cyber attack. In addition to diverting of an information security technology to the control system, a research for detection of a cyber attack, and the like is in progress.

Patent Literature 1 discloses a technology of an encrypted control system, a part of inventors of the present invention being included.

CITATION LIST

Patent Literature

Patent Literature 1: Japanese Patent Application Laid-Open No. 2016-90884

SUMMARY OF INVENTION

Technical Problem

In Patent Literature 1, inventors have successfully realized a control system in which a public key and/or a private key is not necessary for a controller that is a core part of the control system since arithmetic processing is directly performed on encrypted input data and output data by the controller. According to this invention, only a plant needs to be equipped with a private key in the control system, and reduction in a risk of leakage of a public key and/or a private key is realized.

However, only one pair of a public key and a private key is used in Patent Literature 1. Thus, when a huge amount of computer resources such as cloud computing is used, there is a possibility that a cipher is decrypted.

The present invention is to provide an encrypted control system, an encrypted control method, and an encrypted control program that can solve such a problem and can further reduce a risk of leakage of a cipher key.

Solution to Problem

In order to solve the above problem, an encrypted control system of the present invention includes a controller and a plant-side control device. The controller includes a first encryption processing unit that encrypts a target value with a public key and outputs an encrypted target value, a first table record selection processing unit that selects, for the first encryption processing unit, a predetermined record from a public key sub-table storing a plurality of public keys and a predetermined record from an encrypted parameter table including a record in which an encrypted parameter acquired by encryption of a parameter of a control system with a public key in the public key sub-table is recorded, a multiplication unit that receives an encrypted target error from the plant-side control device, performs multiplication thereof by the encrypted parameter selected by the first table record selection processing unit, and outputs an encrypted control input, and the first date and time information generation unit that provides date and time information added to the encrypted control input output from the multiplication unit, and that gives start timing to the first table record selection processing unit. The plant-side control device includes a decryption processing unit that acquires a target value by decrypting the encrypted target value received from the controller and acquires a control input by decrypting the encrypted control input received from the controller, and a control processing unit that controls a predetermined object to be controlled on the basis of the control input. A signal conversion processing unit that acquires an observation value from a sensor that observes the object to be controlled, a target error arithmetic processing unit that calculates a target error by subtracting the observation value from the target value, a second encryption processing unit that encrypts the target error and outputs an encrypted target error, a second table record selection processing unit that selects, for the decryption processing unit, a predetermined record from a public key table in which a plurality of public keys and private keys paired with the public keys are stored and that selects, for the second encryption processing unit, a predetermined record from the public key table, and a second date and time information generation unit that provides date and time information added to the encrypted target error output from the second encryption processing unit, and that gives start timing to the second table record selection processing unit are further included. Then, the first date and time information generation unit and the second date and time information generation unit mutually generate the start timing simultaneously.

Advantageous Effects of Invention

According to the present invention, it is possible to provide an encrypted control system, an encrypted control method, and an encrypted control program that can further reduce a risk of leakage of a cipher key.

Problems, configurations, and effects other than those described above will be clarified in the following description of embodiments.

BRIEF DESCRIPTION OF DRAWINGS

FIG. 4 is a block diagram illustrating a hardware configuration of a plant-side control device.

FIG. 5 is a block diagram illustrating a hardware configuration of a date and time information source device.

FIG. 8 is a table illustrating field configurations of a public key table, a public key sub-table, and an encrypted parameter table.

DESCRIPTION OF EMBODIMENTS

Embodiment of Encrypted Control System 101

Figure 1:
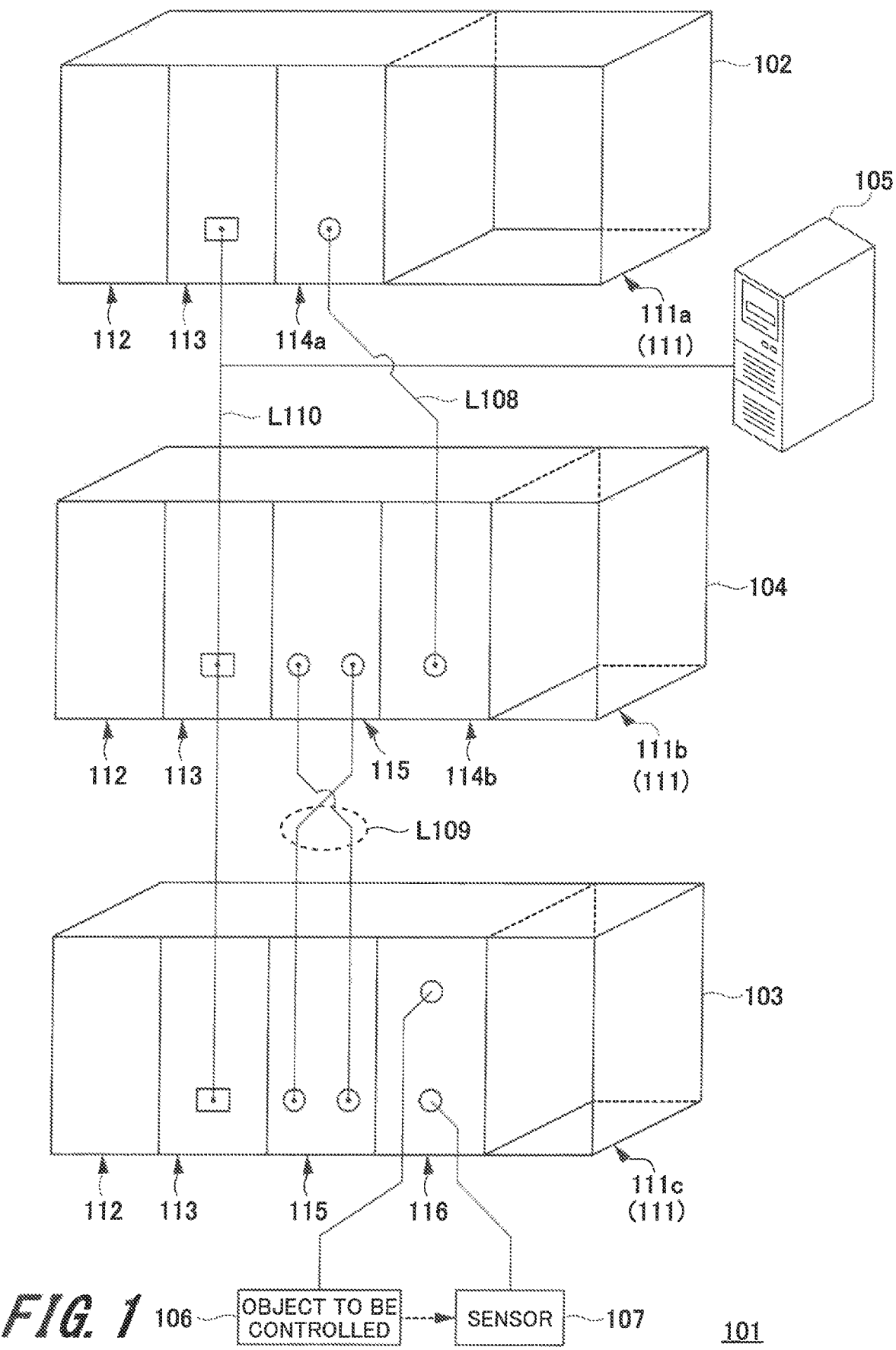
FIG. 1 is a schematic diagram illustrating an entire configuration of an encrypted control system according to an embodiment of the present invention.

FIG. 1 is a schematic diagram illustrating an entire configuration of an encrypted control system 101 according to an embodiment of the present invention. Note that an encrypted value is expressed by a function called Enc( ) in the following description.

The encrypted control system 101 includes an input device 102, a plant-side control device 103, a controller 104, and a date and time information source device 105.

The input device 102 transmits an encrypted target value Enc(r), which is a target value r encrypted by public key encryption, to the plant-side control device 103 through the controller 104.

An object to be controlled 106 and a sensor 107 are connected to the plant-side control device 103. The plant-side control device 103 gives a control signal to the object to be controlled 106 and acquires an observation value y, which is state information of the object to be controlled 106, from the sensor 107. Then, connection to the controller 104 is made via a second control network L109, and encrypted control information is transmitted/received.

The controller 104 is connected to the input device 102 via a first control network L108, and is also connected to the plant-side control device 103 via the second control network L109. The controller 104 receives an encrypted target value Enc(r) from the input device 102 through the first control network L108, and receives an encrypted target error Enc(ε) from the plant-side control device 103 through the second control network L109. Then, predetermined arithmetic processing is performed with these pieces of encrypted information being kept encrypted without being decrypted, and an encrypted control input Enc(u) that is a result of the calculation is transmitted to the plant-side control device 103 through the second control network L109.

As public key encryption used in the encrypted control system 101 according to the embodiment of the present invention, public key encryption, which has homomorphism, such as Rivest Shamir Adleman (RSA) encryption is used similarly to that disclosed in Patent Literature 1. In public key encryption with homomorphism, two encrypted values are multiplied as they are without decryption and the multiplied value is encrypted, whereby correspondence with a value acquired by multiplying of values before encryption is acquired.

A description related to homomorphism of public key encryption is described in Patent Literature 1, and there is no change in arithmetic processing of public key encryption itself except for a point that a plurality of pairs of public keys and private keys is used in the encrypted control system 101 according to the embodiment of the present invention. Thus, a detailed description of the public key encryption itself is omitted.

Each of the input device 102, the controller 104, and the plant-side control device 103 are connected to the date and time information source device 105 through an information network L110. The date and time information source device 105 is a personal computer or server on which a network OS, a network time protocol (NTP) server, and an NTP client operate.

The first control network L108 and the second control network L109 are networks that place importance on certainty of data transfer, and various kinds of network interfaces can be used.

On the other hand, the information network L110 is not required to have as much certainty as the control networks. In the embodiment of the present invention, a known TCP/IP is used.

The input device 102, the controller 104, and the plant-side control device 103 are devices called programmable controllers. According to a necessary function, a module having a size housed in a slot is housed in a case-like mount base 111 having many slots. The mount base 111 has a built-in interface that connects modules. When a module is inserted into a slot, transmission/reception of data between modules and supply of appropriate power are established.

A CPU module 112, an information network module 113, and a first control network module 114a are mounted on the mount base 111a of the input device 102.

A CPU module 112, an information network module 113, a first control network module 114b, and a second control network module 115 are mounted on a mount base 111b of the controller 104.

A CPU module 112, an information network module 113, a second control network module 115, and an input/output module 116 are mounted on a mount base 111c of the plant-side control device 103.

The first control network module 114a of the input device 102 is on a transmission side, and the first control network module 114b of the controller 104 is on a reception side.

In the second control network modules 115 of the controller 104 and the plant-side control device 103, mutual transmission-side terminals and reception-side terminals are connected to each other.

[Hardware Configuration of Input Device 102]

Figure 2:
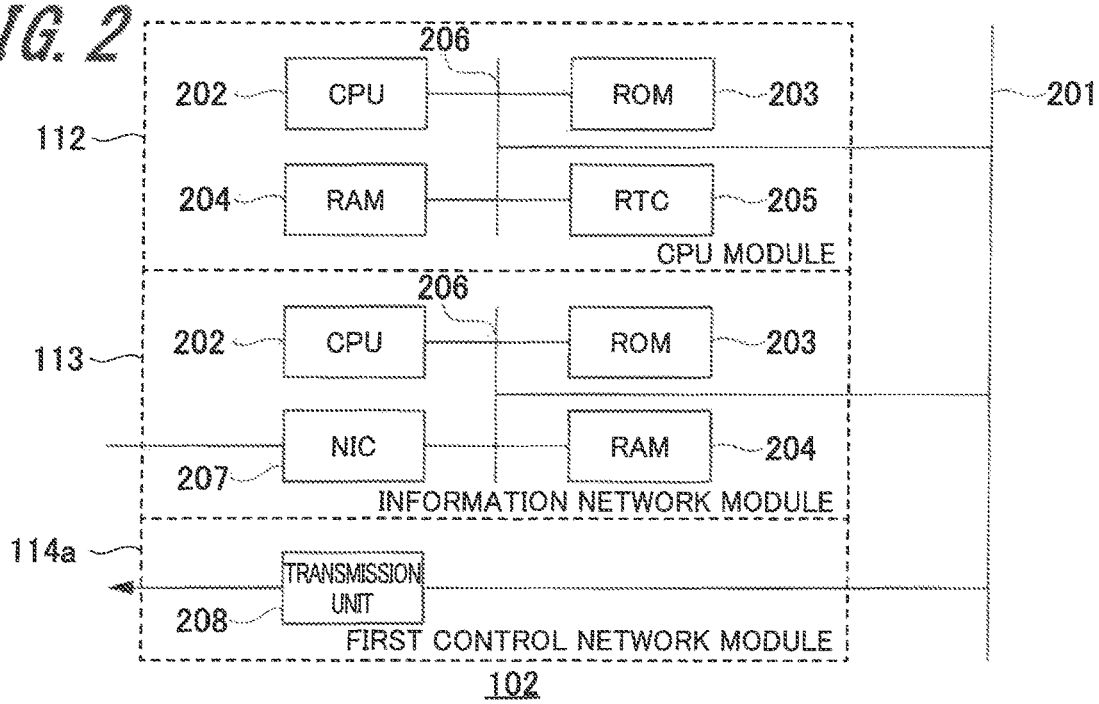
FIG. 2 is a block diagram illustrating a hardware configuration of an input device.

FIG. 2 is a block diagram illustrating a hardware configuration of the input device 102.

The input device 102 includes the CPU module 112, the information network module 113, and the first control network module 114a connected to a module bus 201 provided in the mount base 111.

The CPU module 112 includes a CPU 202, a ROM 203, a RAM 204, and a real-time clock (RTC) 205 that generates date and time information, these being connected to an internal bus 206. The internal bus 206 is connected to the module bus 201.

The ROM 203 of the CPU module 112 stores a program for executing control arithmetic processing, encryption processing, and the like in the encrypted control system 101.

The information network module 113 includes a CPU 202, a ROM 203, a RAM 204, and a network interface card (NIC) 207 connected to an internal bus 206. The internal bus 206 is connected to the module bus 201. The ROM 203 of the information network module 113 stores a network OS, an NTP server program, an NTP client program, and the like.

A transmission unit 208 of the first control network module 114a is connected to the module bus 201.

[Hardware Configuration of Controller 104]

Figure 3:
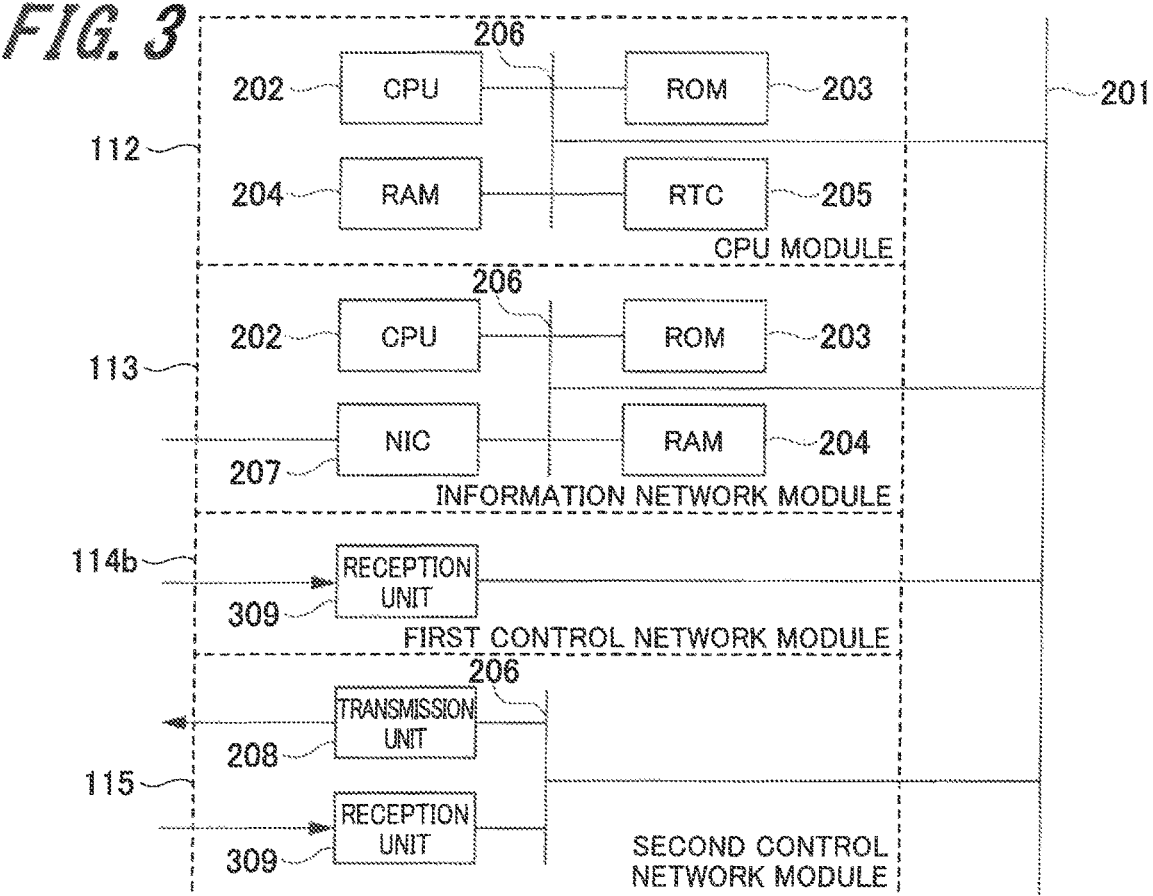
FIG. 3 is a block diagram illustrating a hardware configuration of a controller.

FIG. 3 is a block diagram illustrating a hardware configuration of the controller 104.

The controller 104 includes the CPU module 112, the information network module 113, the first control network module 114b, and the second control network module 115 connected to a module bus 201 provided in the mount base 111.

Since the CPU module 112 and the information network module 113 are the same as those of the input device 102, a description thereof is omitted.

A reception unit 309 of the first control network module 114b is connected to the module bus 201.

In the second control network module 115, a transmission unit 208 and the reception unit 309 are connected to an internal bus 206. The internal bus 206 is connected to the module bus 201.

[Hardware Configuration of Plant-Side Control Device 103]

FIG. 4 is a block diagram illustrating a hardware configuration of the plant-side control device 103.

The plant-side control device 103 includes the CPU module 112, the information network module 113, the second control network module 115, and the input/output module 116 connected to a module bus 201 provided in the mount base 111.

Since the CPU module 112, the information network module 113, and the second control network module 115 are the same as those of the controller 104, a description thereof is omitted.

The input/output module 116 includes an A/D converter 410 to which the sensor 107 is connected, and a D/A converter 411 to which the object to be controlled 106 is connected, the converters being connected to an internal bus 206. The internal bus 206 is connected to the module bus 201. Note that the input/output module 116 is just an example, and there is a case where a signal processing circuit or the like connected to the A/D converter 410 and the D/A converter 411 is necessary according to a connected object such as the object to be controlled 106 or the sensor 107.

[Hardware Configuration of Date and Time Information Source Device 105]

FIG. 5 is a block diagram illustrating a hardware configuration of the date and time information source device 105.

The date and time information source device 105 including a server device, a personal computer, or the like includes a CPU 501, a ROM 502, a RAM 503, a non-volatile storage 504, an RTC 505, and an NIC 506 connected to a bus 507. In a case where a personal computer is used, a display unit 508 and an operation unit 509 may be included.

The non-volatile storage 504 stores a network OS, an NTP server program, and an NTP client program.

[Software Function of Encrypted Control System 101 in Control Network]

Figure 6:
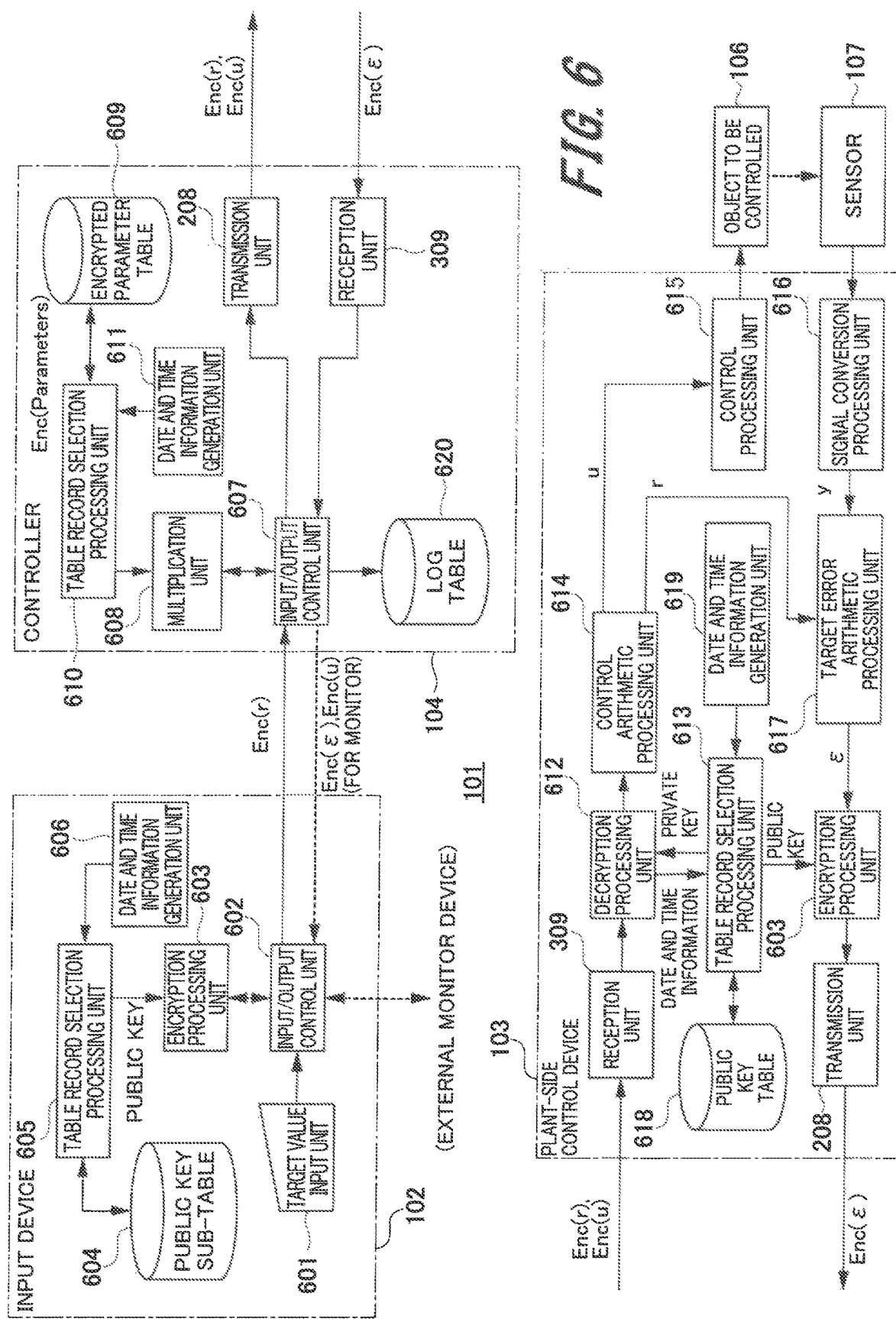
FIG. 6 is a block diagram illustrating a software function, in a control network, of the encrypted control system.

FIG. 6 is a block diagram illustrating a software function, in the control network, of the encrypted control system 101. In FIG. 6, illustration of the information network L110 is omitted due to space limitation. The information network L110 will be described with reference to FIG. 7.

The input device 102 generates an encrypted target value Enc(r) with respect to the plant-side control device 103, and transmits the value to the plant-side control device 103 via the controller 104.

A target value input unit 601 gives a non-encrypted target value r to an input/output control unit 602.

The input/output control unit 602 delivers, to an encryption processing unit 603, the target value r input from the target value input unit 601. Then, an encrypted target value Enc(r) generated by an encryption processing unit 603 is received and transmitted to the controller 104.

By using a public key record selected from a public key sub-table 604 by a table record selection processing unit 605, the encryption processing unit 603 performs encryption processing on the target value r received from the input/output control unit 602. Then, the generated encrypted target value Enc(r) is delivered to the input/output control unit 602.

The table record selection processing unit 605 generates a record number (label) of the public key sub-table 604 on the basis of current date and time information received from a date and time information generation unit 606. Then, a public key recorded in a record of the public key sub-table 604 which record corresponds to the generated label is read and delivered to the encryption processing unit 603.

The date and time information generation unit 606 outputs the current date and time information, and performs start-and-stop control with respect to the table record selection processing unit 605.

The encrypted target value Enc(r) transmitted from the input device 102 to the controller 104 through a cable of the first control network module 114a is input to an input/output control unit 607 of the controller 104.

The input/output control unit 607 transmits the encrypted target value Enc(r) received from the input device 102 to the plant-side control device 103 through the transmission unit 208 of the second control network module 115 without change. Then, an encrypted target error Enc(ε) received from the plant-side control device 103 through the reception unit 309 of the second control network module 115 is delivered to a multiplication unit 608.

The multiplication unit 608 calculates an encrypted control input Enc(u) by performing multiplication processing with the encrypted target error Enc(ε) by using an encrypted parameter Enc(Parameters) selected from an encrypted parameter table 609 by the table record selection processing unit 610. Note that the multiplication processing between the encrypted parameter Enc(Parameters) and the encrypted target value Enc(r) in the multiplication unit 608 is not simple multiplication but partial multiplication processing disclosed in Patent Literature 1.

The multiplication unit 608 delivers the encrypted control input Enc(u) calculated by multiplication processing between the encrypted parameter Enc(Parameters) and the encrypted target value Enc(r) to the input/output control unit 607.

On the basis of current date and time information included in a data frame received from the plant-side control device 103 through the reception unit 309 of the second control network module 115, the table record selection processing unit 610 generates a record number (label) of the encrypted parameter table 609. Then, an encrypted parameter recorded in a record of the encrypted parameter table 609 which record corresponds to the generated label is read and delivered to the multiplication unit 608.

A date and time information generation unit 611 outputs current date and time information, and also outputs date and time information at a start of a synchronized operation ("start date and time information" in the following) which information is instructed by a date and time information generation unit 611 of the controller 104. Also, start-and-stop control for the table record selection processing unit 610 is performed. However, unlike the date and time information generation unit 606 of the input device 102, current date and time information generated by the date and time information generation unit 611 of the controller 104 is not used for calculation of a label of the encrypted parameter table 609 which calculation is executed by the table record selection processing unit 610. Instead, the current date and time information generated by the date and time information generation unit 611 is stored as encode date and time information in an encode date and time field of a data frame of the encrypted control input Enc(u) transmitted from the multiplication unit 608 through the input/output control unit 607 and the transmission unit 208.

The encrypted target value Enc(r) and the encrypted control input Enc(u) transmitted from the controller 104 to the plant-side control device 103 through the transmission unit 208 of the second control network module 115 are input into a decryption processing unit 612 through the reception unit 309 of the second control network module 115 of the plant-side control device 103.

The decryption processing unit 612 decrypts the encrypted target value Enc(r) and the encrypted control input Enc(u) by using a private key acquired from a table record selection processing unit 613. Values to be bases of a decrypted target value r and control input u are delivered to a control arithmetic processing unit 614.

The control arithmetic processing unit 614 calculates values to be bases of the target value r and the control input u and generates the target value r and the control input u. The control input u is delivered to a control processing unit 615.

The control processing unit 615 generates a control signal from the control input u and controls the object to be controlled 106. For example, when the object to be controlled 106 is a motor, the control processing unit 615 controls voltage, a phase, and the like applied to the motor. When the object to be controlled 106 is controlled by the control processing unit 615, an operation of the object to be controlled 106 is detected by the sensor 107.

An observation signal output from the sensor 107 is converted into an observation value y by a signal conversion processing unit 616. The observation value y output from the signal conversion processing unit 616 is input into a target error arithmetic processing unit 617 together with the target value r output from the control arithmetic processing unit 614. The target error arithmetic processing unit 617 subtracts the observation value y from the target value r and outputs a target error ε.

The target error ε is encrypted by the encryption processing unit 603, and is converted into an encrypted target error Enc(ε). The encrypted target error Enc(ε) is transmitted to the controller 104 through the transmission unit 208 of the second control network module 115.

On the basis of the current date and time information and the start date and time information included in the data frame received from the controller 104 through the reception unit 309 of the second control network module 115, the table record selection processing unit 613 generates a record number (label) of a public key table 618. Then, a private key recorded in a record of the public key table 618 which record corresponds to the generated label is read and delivered to the decryption processing unit 612. Similarly, a public key recorded in a record of the public key table 618 which record corresponds to the generated label is read and delivered to the encryption processing unit 603.

A date and time information generation unit 619 outputs current date and time information, and also outputs date and time information at a start of a synchronized operation ("start date and time information" in the following) which information is instructed by the date and time information generation unit 611 of the controller 104. Also, the date and time information generation unit 619 performs start-and-stop control for the table record selection processing unit 610. However, unlike the date and time information generation unit 606 of the input device 102, the current date and time information generated by the date and time information generation unit 619 of the plant-side control device 103 is not used for calculation of a label of the public key table 618 which calculation is executed by the table record selection processing unit 613. Instead, the current date and time information generated by the date and time information generation unit 619 is stored as encode date and time information into an encode date and time field of a data frame of the encrypted target error Enc(ε) transmitted from the encryption processing unit 603 through the transmission unit 208.

Note that an external monitor device (not illustrated) may be connected to the input/output control unit 602 of the input device 102 as necessary. A monitoring operator of the encrypted control system 101 connects the external monitoring device to the input device 102 and executes a predetermined monitoring task or the like.

A log table 620 in which the encrypted target value Enc(r), the encrypted control input Enc(u), the encrypted target error Enc(ε), and the like are recorded in a manner of being kept encrypted is provided in the input/output control unit 607 of the controller 104 and used for the monitoring task.

[Software Function of Encrypted Control System 101 in Information Network L110]

Figure 7:
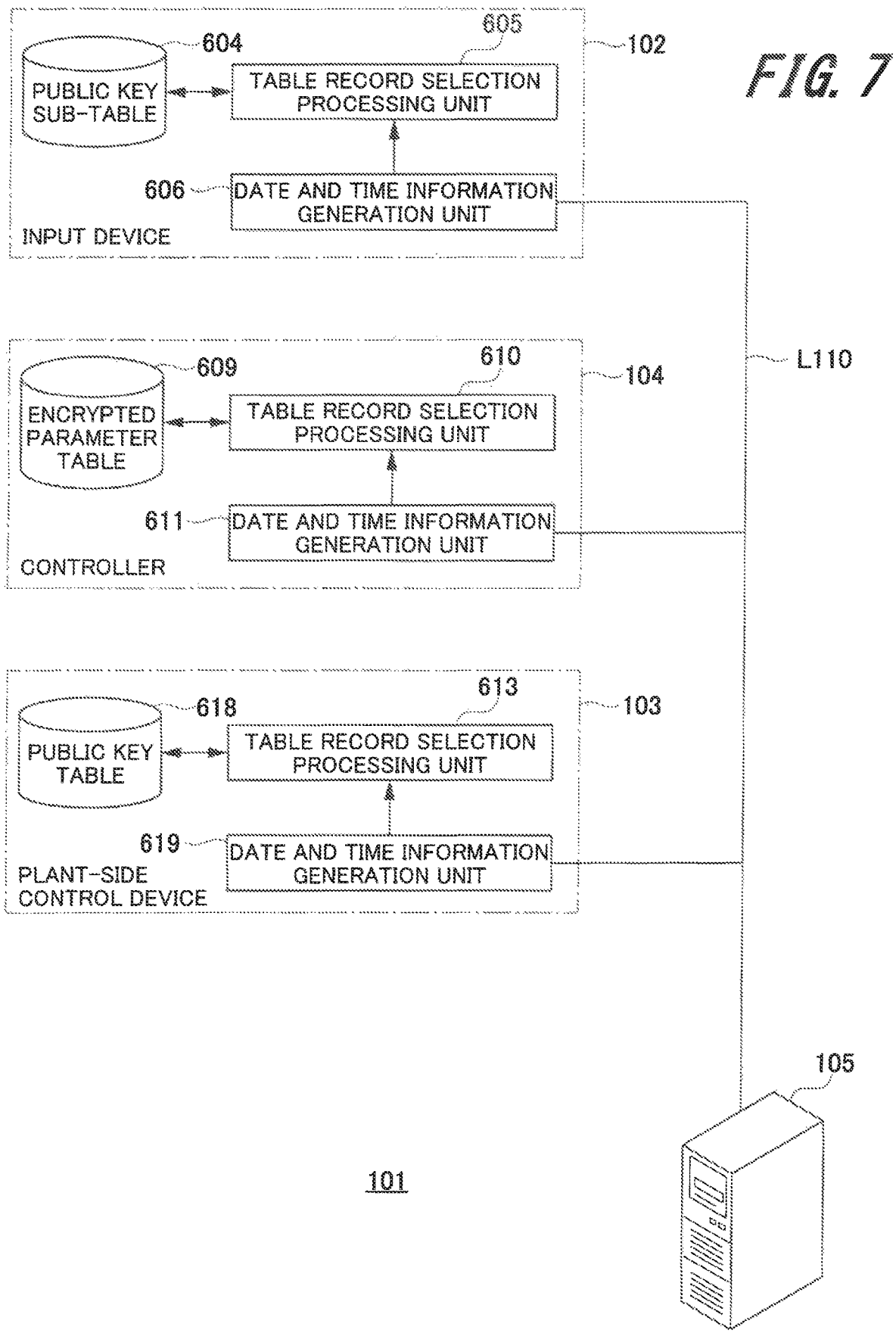
FIG. 7 is a block diagram illustrating a software function, in an information network, of the encrypted control system.

FIG. 7 is a block diagram illustrating a software function, in the information network L110, of the encrypted control system 101.

The date and time information generation unit 606 of the input device 102, the date and time information generation unit 611 of the controller 104, and the date and time information generation unit 619 of the plant-side control device 103 are connected to the date and time information source device 105 through the information network L110.

Similarly to the date and time information source device 105, the date and time information generation unit 606 of the input device 102, the date and time information generation unit 611 of the controller 104, and the date and time information generation unit 619 of the plant-side control device 103 have functions of a network OS, an NTP server program, and an NTP client program. Each date and time information generation unit 606 is synchronized with date and time information of the date and time information source device 105.

Furthermore, one of the date and time information generation unit 606, 611 and 619 of the input device 102, the date and time information generation unit 611 of the controller 104, and the date and time information generation unit 619 of the plant-side control device 103 plays a role of a master that commands a start of a synchronized operation, and the remaining two play a role of a slave that executes the synchronized operation according to an instruction from the master.

[Field Configuration of Table]

FIG. 8 is a table illustrating field configurations of the public key table 618, the public key sub-table 604, and the encrypted parameter table 609.

The public key table 618 has a record number field, a public key field, and a private key field.

In the record number field, an integer starting from 1 is stored. This record number is a number for uniquely identifying a record of the public key table 618, and is also called a label.

The public key field stores a public key, which is to encrypt a desired value, of a public key cryptosystem.

The private key field stores a private key, which is to decrypt an encrypted desired value and is paired with a public key in the public key field, of the public key cryptosystem.

The public key sub-table 604 has a record number field and a public key field.

That is, the public key sub-table 604 is a subset of the public key table 618 which subset is acquired by deletion of the private key field from the public key table 618.

The encrypted parameter table 609 has a record number field, an encrypted first parameter field, an encrypted second parameter field, and an encrypted third parameter field.

The encrypted first parameter field stores an encrypted first parameter Enc(Kp) acquired by encryption of a first parameter Kp to be a gain of the control system.

The encrypted second parameter field stores an encrypted second parameter Enc(Ki) acquired by encryption of a second parameter Ki to be a gain of the control system.

The encrypted third parameter field stores an encrypted third parameter Enc(Kd) acquired by encryption of a third parameter Kd to be a gain of the control system.

The first parameter Kp, the second parameter Ki, and the third parameter Kd are invariable values in the control system, and are determined by a predetermined calculation in designing of the control system.

Note that PID control is assumed for the first parameter Kp, the second parameter Ki, and the third parameter Kd, but the control system is not limited to the PID control. In the encrypted parameter table 609, a field of an encrypted parameter is provided according to the number of parameters required by the control system.

In an encrypted first parameter field in a record with a record number field being "1" in the encrypted parameter table 609, an encrypted first parameter Enc(Kp) acquired by encryption of the first parameter Kp by utilization of a public key stored in a public key field in a record with a record number field being "1" in the public key table 618 is stored.

Similarly, in an encrypted second parameter field in the record with the record number field being "1" in the encrypted parameter table 609, an encrypted second parameter Enc(Ki) acquired by encryption of the second parameter Ki by utilization of a public key stored in the public key field in the record with the record number field being "1" in the public key table 618 is stored.

Similarly, in an encrypted third parameter field in the record with the record number field being "1" in the encrypted parameter table 609, an encrypted third parameter Enc(Kd) acquired by encryption of the third parameter Kd by utilization of a public key stored in the public key field in the record with the record number field being "1" in the public key table 618 is stored.

In an encrypted first parameter field in a record with a record number field being "2" in the encrypted parameter table 609, an encrypted first parameter Enc(Kp) acquired by encryption of the first parameter Kp by utilization of a public key stored in a public key field in a record with a record number field being "2" in the public key table 618 is stored.

Similarly, an encrypted parameter of each record in the encrypted parameter table 609 is encrypted with a public key stored in a public key field in the public key table 618 which field is linked to a record number field of each record.

[Table Record Selection Processing Unit 605]

Figure 9A:
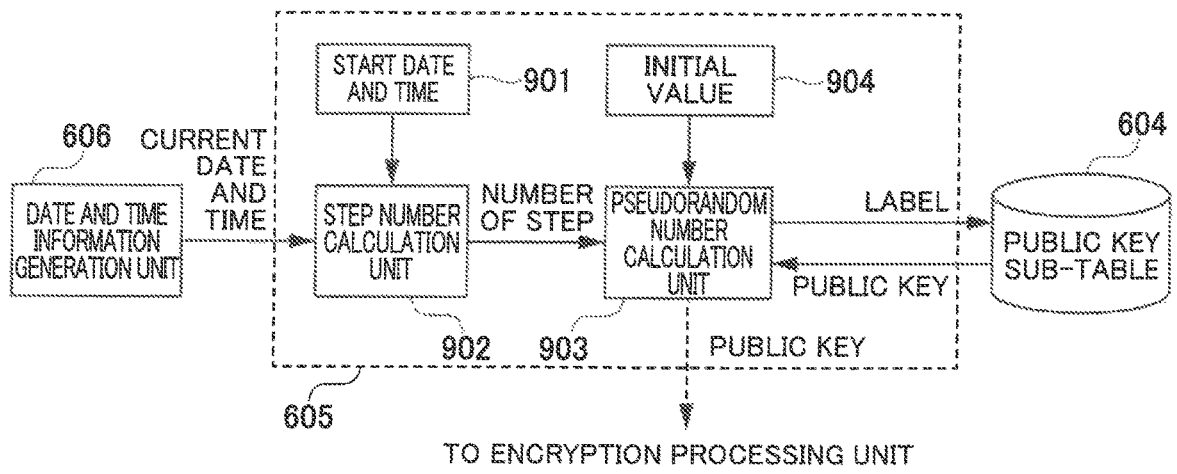
FIG. 9 is a block diagram for describing software functions of table record selection processing units of an input device and a controller, and a software function, for an encrypted target value, of a table record selection processing unit of a plant-side control device.

FIG. 9A is a block diagram for describing a software function of the table record selection processing unit 605 of the input device 102.

Current date and time information output from the date and time information generation unit 606 is input into a step number calculation unit 902 together with start date and time information 901 stored at a start of a synchronized operation. The step number calculation unit 902 calculates the number of steps by subtracting the start date and time information 901 from the current date and time information and performing division thereof by step time. For example, in a case where the step time is 10 msec, the current date and time information is 09:30:05.100 on Nov. 1, 2017, and the start date and time information 901 is 09:30:05.000 on Nov. 1, 2017, the number of steps is 100÷10=10. Note that the step time corresponds to a control cycle of the object to be controlled 106.

In an industrial device or the like, a control program related to measurement and control is executed in a certain control cycle. Thus, in the encrypted control system according to the embodiment of the present invention, the number of steps is counted for each control cycle with a start date and time of the control program being 0. This number of steps is used by a pseudorandom number calculation unit 903 described later. Also, although described in detail with reference to FIG. 13, the number of steps is advanced only by "1" between received data and the transmitted data in the plant-side control device 103.

The number of steps output from the step number calculation unit 902 is input into the pseudorandom number calculation unit 903. By being provided with an initial value 904 and repeating deterministic arithmetic processing for the input number of steps, the pseudorandom number calculation unit 903 generates a pseudorandom number of an integer equal to or larger than 0 or a natural number. Remainder calculation of the generated pseudorandom number is performed by utilization of the number of records in the public key sub-table 604, and this remainder becomes a label, that is, a record number. The pseudorandom number calculation unit 903 reads a public key field in the public key sub-table 604 by using the label, and outputs a public key to the encryption processing unit 603. Note that whether a record number is started from 0 (integer equal to or larger than 0) or 1 (natural number) is a matter of design.

The table record selection processing units 605, 610 and 613 of the input device 102, the controller 104, and the plant-side control device 103 are respectively equipped with pseudorandom number calculation units 903 that perform the same arithmetic processing, the same initial value 904 being given thereto. Accordingly, the pseudorandom number calculation units 903 to which the same number of steps is given output the same label.

Figure 9B:
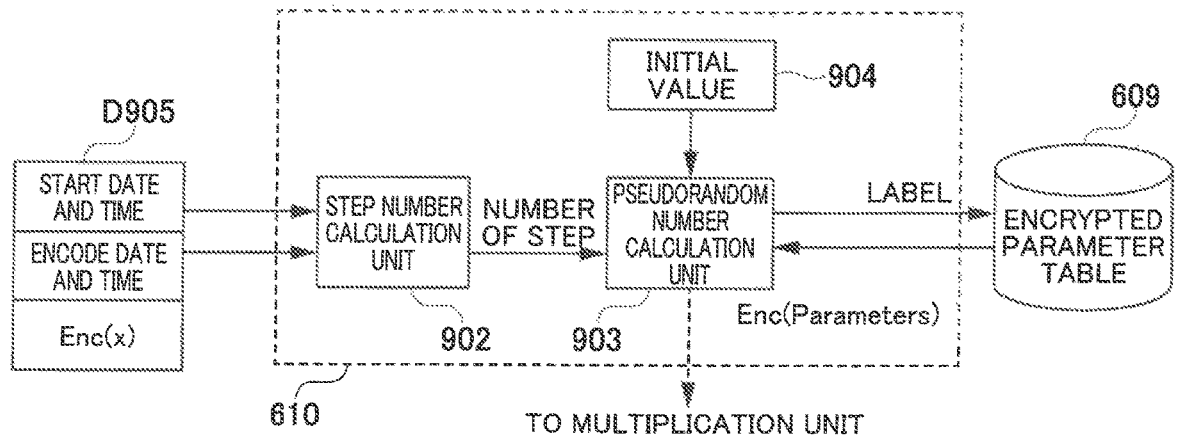

FIG. 9B is a block diagram for describing a software function of the table record selection processing unit 610 of the controller 104.

To a data frame D905 received from the plant-side control device 103, a start date and time field and an encode date and time field are assigned in addition to an encrypted target error Enc(ε).

Encode date and time information included in the encode date and time field and start date and time information 901 included in the start date and time field are input into a step number calculation unit 902. The step number calculation unit 902 calculates the number of steps by subtracting the start date and time information 901 from the encode date and time information and performing division thereof by step time. That is, the processing by the step number calculation unit 902 in the controller 104 is exactly the same as the arithmetic processing itself by the step number calculation unit 902 of the input device 102 except for a point that input data is different.

The number of steps output from the step number calculation unit 902 is input into the pseudorandom number calculation unit 903. By being provided with an initial value 904 and repeating deterministic arithmetic processing for the input number of steps, the pseudorandom number calculation unit 903 generates a pseudorandom number of an integer equal to or larger than 0 or a natural number. Remainder calculation of the generated pseudorandom number is performed by utilization of the number of records in the encrypted parameter table 609, and this remainder becomes a label, that is, a record number. The pseudorandom number calculation unit 903 reads the encrypted first parameter field, the encrypted second parameter field, and the encrypted third parameter field in the encrypted parameter table 609 by using the label, and outputs the encrypted first parameter, the encrypted second parameter, and the encrypted third parameter to the multiplication unit 608.

Figure 9C:
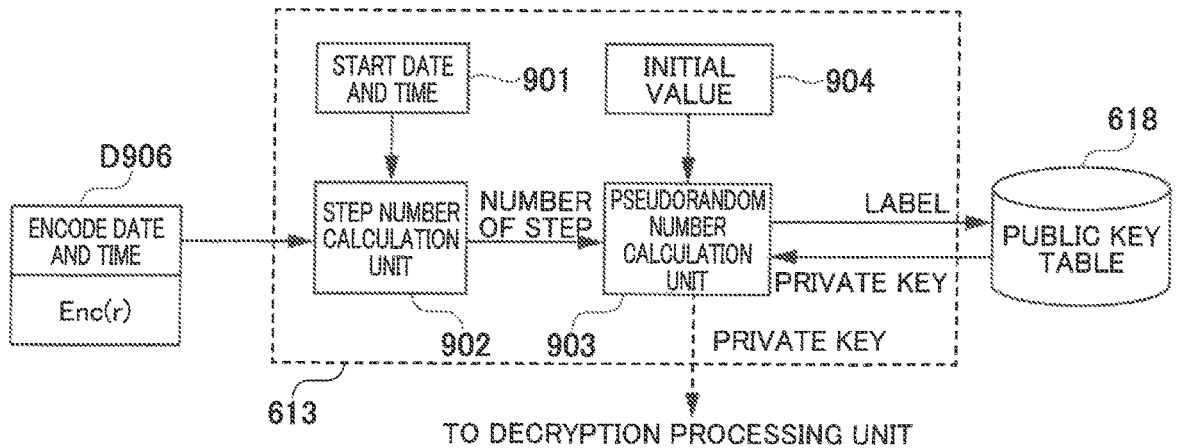

FIG. 9C is a block diagram for describing a software function, for an encrypted target value, of the table record selection processing unit 613 of the plant-side control device 103.

To a data frame D906 received from the input device 102 through the controller 104, an encode date and time field is assigned in addition to an encrypted target value Enc(r).

Encode date and time information included in the encode date and time field is input to the step number calculation unit 902 together with start date and time information 901 stored at a start of a synchronized operation. The step number calculation unit 902 calculates the number of steps by subtracting the start date and time information 901 from the encode date and time information and performing division thereof by step time. That is, the processing, for an encrypted target value, by the step number calculation unit 902 of the plant-side control device 103 is exactly the same as the arithmetic processing itself of the step number calculation unit 902 of the input device 102 except for a point that input data is different.

The number of steps output from the step number calculation unit 902 is input into the pseudorandom number calculation unit 903. By being provided with an initial value 904 and repeating deterministic arithmetic processing for the input number of steps, the pseudorandom number calculation unit 903 generates a pseudorandom number of an integer equal to or larger than 0 or a natural number. Remainder calculation of the generated pseudorandom number is performed by utilization of the number of records in the public key table 618, and this remainder becomes a label, that is, a record number. The pseudorandom number calculation unit 903 reads a private key field of the public key table 618 by using the label, and outputs a private key to the decryption processing unit 612.

Figure 10:
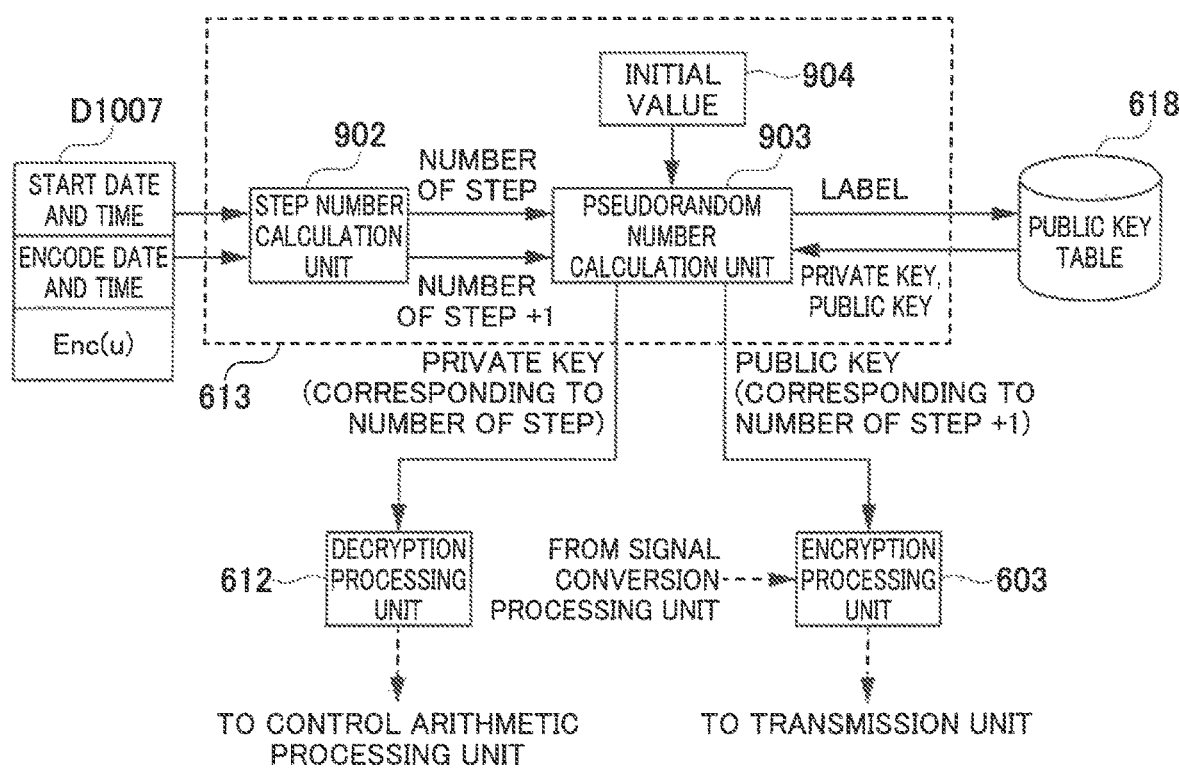
FIG. 10 is a block diagram for describing a software function, for an encrypted control input, of the table record selection processing unit of the plant-side control device.

FIG. 10 is a block diagram for describing a software function, for an encrypted control input, of the table record selection processing unit 613 of the plant-side control device 103.

To a data frame D1007 received from the controller 104, a start date and time field and an encode date and time field are assigned in addition to an encrypted control input Enc(u).

Encode date and time information included in the encode date and time field and start date and time information 901 included in the start date and time field are input into a step number calculation unit 902. The step number calculation unit 902 calculates the number of steps by subtracting the start date and time information 901 from the encode date and time information and performing division thereof by step time.

Here, the step number calculation unit 902 illustrated in FIG. 10 is different from the step number calculation units 902 in FIG. 9A, FIG. 9B, and FIG. 9C in a point of outputting the number of steps +1 in addition to subtracting the start date and time information 901 from the encode date and time information, performing division thereof by step time, and outputting the number of steps to the pseudorandom number calculation unit 903.

Values of the number of steps and the number of steps +1 output from the step number calculation unit 902 are input into a pseudorandom number calculation unit 903. By being provided with an initial value 904 and repeating deterministic arithmetic processing for the input number of steps, the pseudorandom number calculation unit 903 generates a pseudorandom number of an integer equal to or larger than 0 or a natural number. Remainder calculation of the generated pseudorandom number is performed by utilization of the number of records in the public key table 618, and this remainder becomes a label, that is, a record number.

The pseudorandom number calculation unit 903 reads a private key field of the public key table 618 by using a label corresponding to the number of steps, and outputs a private key to the decryption processing unit 612.

Next, the pseudorandom number calculation unit 903 reads a public key field of the public key table 618 by using a label corresponding to the value of the number of steps +1, and outputs a public key to the encryption processing unit 603.

The same deterministic arithmetic processing is embedded in the pseudorandom number calculation units 903 respectively provided in the table record selection processing unit 605 of the input device 102 illustrated in FIG. 9A, the table record selection processing unit 610 of the controller 104 illustrated in FIG. 9B, and the table record selection processing unit 613 of the plant-side control device 103 illustrated in FIG. 9C and FIG. 10. Thus, when the same initial value 904 is given, the same label is output when the number of steps is the same.

[Synchronized Operation Starting Processing]

Figure 11:
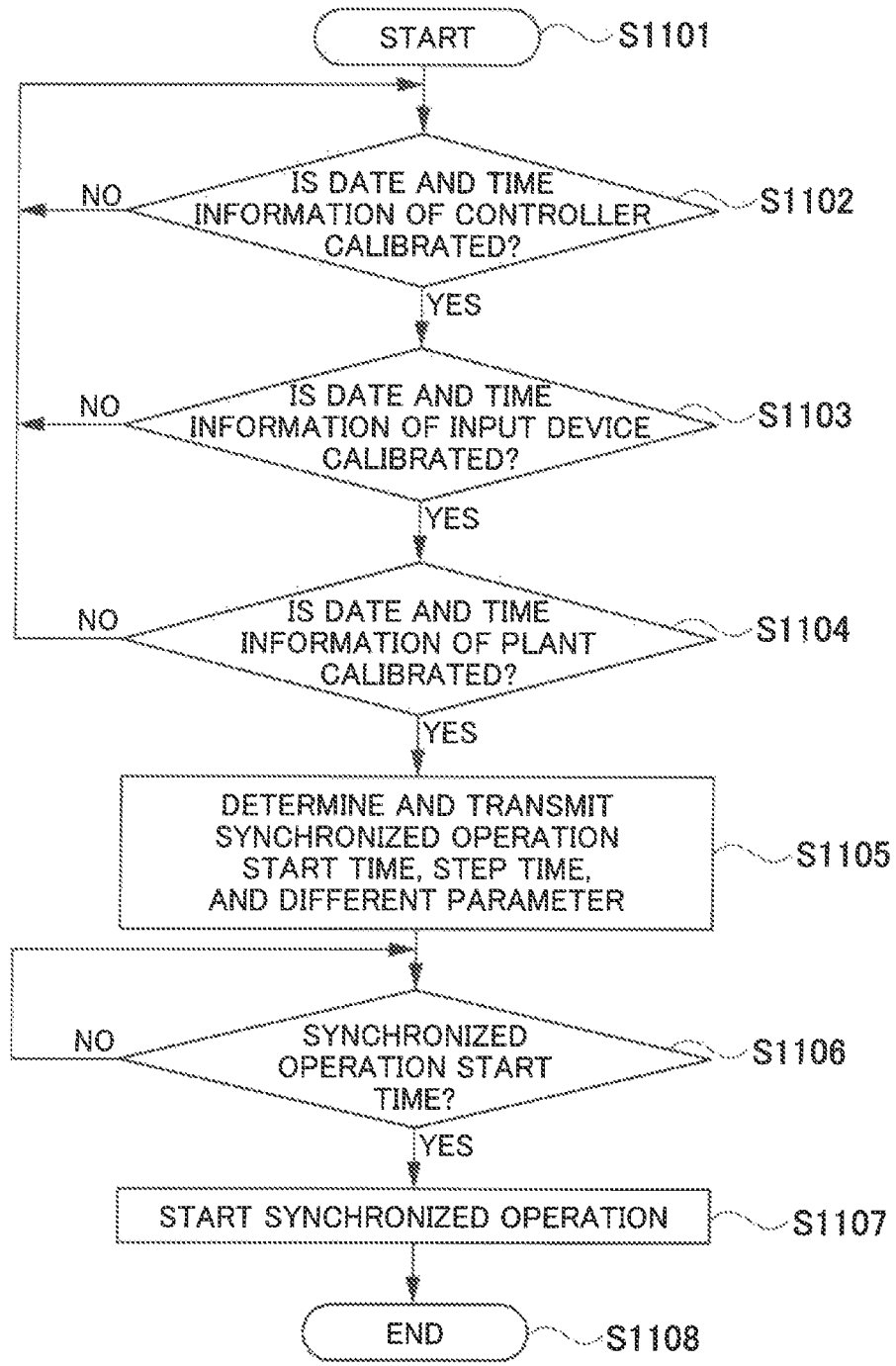
FIG. 11 is a flowchart illustrating a flow of synchronized operation starting processing in a date and time information generation unit of the controller.

FIG. 11 is a flowchart illustrating a flow of synchronized operation starting processing in the date and time information generation unit 611 of the controller 104. In FIG. 11, a description will be made on the assumption that the date and time information generation unit 611 of the controller 104 is a master. However, a case where the input device 102 or the plant-side control device 103 is a master is in a similar manner.

When the processing is started (S1101), the date and time information generation unit 611 of the controller 104 checks whether own date and time information is calibrated to have a sufficiently small error with respect to date and time information output from the date and time information source device 105 (S1102).

When the date and time information of the date and time information generation unit 611 itself of the controller 104 is calibrated to have a sufficiently small error with respect to the date and time information output from the date and time information source device 105 (YES in S1102), the date and time information generation unit 611 of the controller 104 subsequently inquires the date and time information generation unit 606 of the input device 102 whether the date and time information generation unit 606 of the input device 102 is calibrated to have a sufficiently small error with respect to the date and time information output from the date and time information source device 105 (S1103).

When the date and time information of the date and time information generation unit 606 of the input device 102 is calibrated to have a sufficiently small error with respect to the date and time information output from the date and time information source device 105 (YES in S1103), the date and time information generation unit 611 of the controller 104 subsequently inquires the date and time information generation unit 619 of the plant-side control device 103 whether the date and time information generation unit 619 of the plant-side control device 103 is calibrated to have a sufficiently small error with respect to the date and time information output from the date and time information source device 105 (S1104).

When calibration of the date and time information is not completed normally in any of conditional branches in Step S1102, S1103, and S1104 (NO in S1102, NO in S1103, and NO in S1104), the processing returns to Step S1102 and the checking operation is repeated.

When the date and time information of the date and time information generation unit 619 of the plant-side control device 103 is calibrated to have a sufficiently small error with respect to the date and time information output from the date and time information source device 105 in Step S1104 (YES in S1104), the date and time information generation units 606, 611 and 619 of all of the input device 102, the controller 104, and the plant-side control device 103 are calibrated at this time point. Thus, in a preparation stage for the synchronized operation, the date and time information generation unit 611 of the controller 104 determines, in cooperation with the pseudorandom number calculation unit 903 of the table record selection processing unit 610, parameters such as time of starting the synchronized operation, step time, and an initial value 904 given to the pseudorandom number calculation unit 903 of the input device 102 and the pseudorandom number calculation unit 903 of the plant-side control device 103, and performs transmission thereof to the date-and-time information generation units 606 and 619 of the input device 102 and the plant-side control device 103 (S1105).

When the preparation for the synchronized operation is completed in Step S1105, the date and time information generation unit 611 of the controller 104 stands by until the set synchronized operation start time comes (NO in S1106). When the synchronized operation start time comes (YES in S1106), the synchronized operation is started (S1107) and the series of processing is ended (S1108).

[Pseudorandom Number Calculation Processing of Pseudorandom Number Calculation Unit 903]

A pseudorandom number used by the pseudorandom number calculation unit 903 needs to be devised in such a manner that a malicious third party cannot easily find regularity. An example of a pseudorandom number generating function to which an addition theorem of an elliptic curve function frequently used in cryptography is applied will be described.

Figure 12:
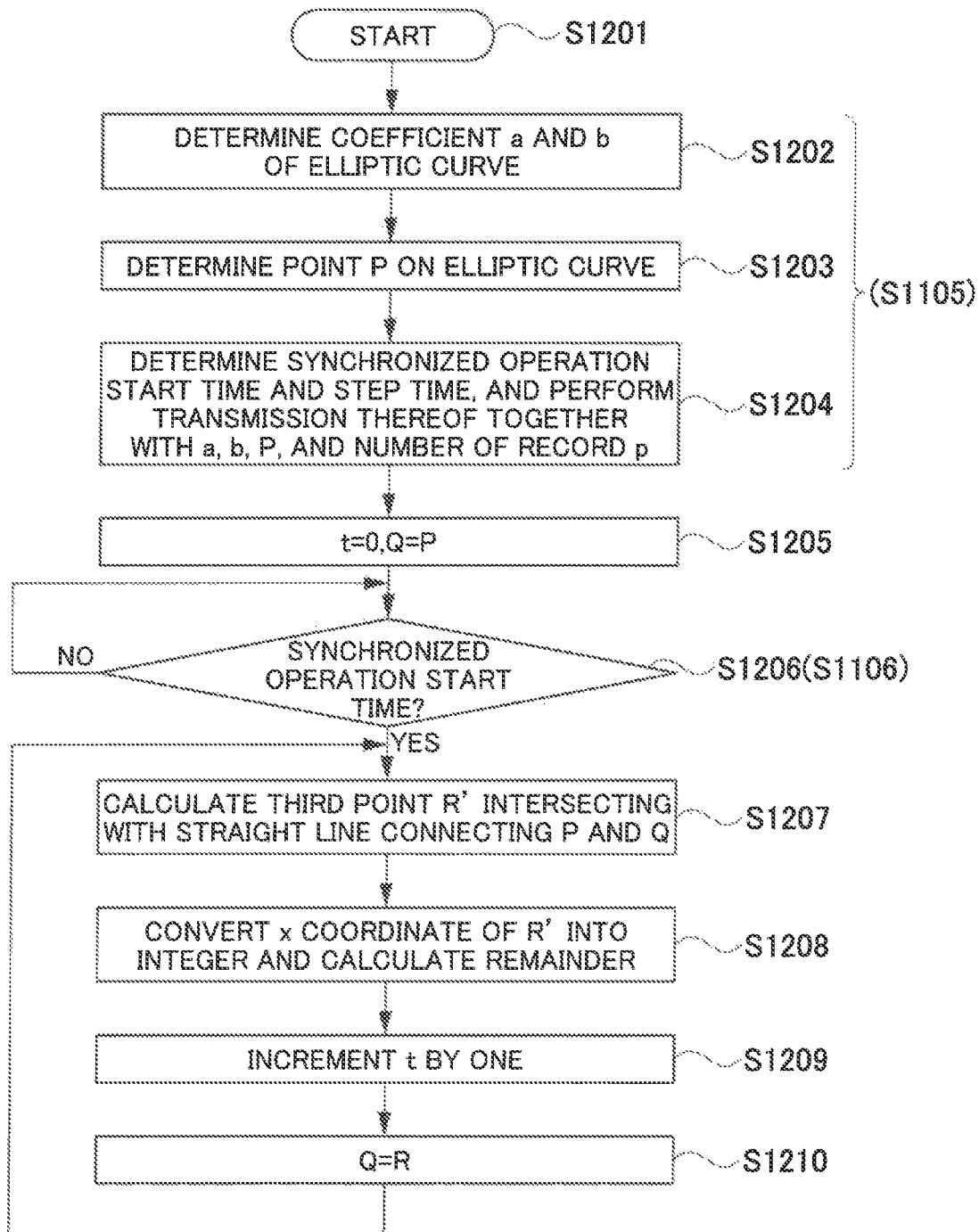
FIG. 12 is a flowchart illustrating a flow of an operation of a pseudorandom number calculation unit of the controller.

FIG. 12 is a flowchart illustrating a flow of an operation of the pseudorandom number calculation unit 903 of the controller 104.

When the processing is started (S1201), the pseudorandom number calculation unit 903 first determines coefficients a and b of an elliptic curve function $y^2=x^3+ax+b$ (S1202).

Next, the pseudorandom number calculation unit 903 determines a point P on the elliptic curve determined in Step S1202 (S1203). This point P has an essential condition that a y coordinate is not 0. The coefficients a and b and the point P in the above, and the number of records p of each of the public key sub-table 604, the encrypted parameter table 609, and the public key table 618 are initial values 904 given to the pseudorandom number calculation unit 903 of the input device 102 and the pseudorandom number calculation unit 903 of the plant-side control device 103.

Next, in cooperation with the date and time information generation unit 611, the pseudorandom number calculation unit 903 transmits the time of starting the synchronized operation, the step time, and the coefficients a and b and the point P that are the initial values 904 to the date and time information generation unit 606 of the input device 102 and the date and time information generation unit 619 of the plant-side control device 103 (S1204).

Step S1202, S1203, and S1204 in the above correspond to Step S1105 in FIG. 11.

Next, the pseudorandom number calculation unit 903 initializes the number of steps t to 0, and assigns coordinate information of the point P to a point Q (S1205). Then, under the control of the date and time information generation unit 611, the synchronized operation start time is waited for (S1206). Step S1206 corresponds to Step S1106 in FIG. 11.

When the synchronized operation start time comes (YES in S1206), the date and time information generation unit 611 gives a start trigger to the pseudorandom number calculation unit 903. Receiving this, the pseudorandom number calculation unit 903 continues the processing in and after this.

First, the pseudorandom number calculation unit 903 calculates coordinates of a third point R on the elliptic curve which point intersects with a straight line connecting the point P and the point Q (S1207). In a case where the point P and the point Q are at the same coordinates, an intersection point that intersects with a tangent on the elliptic curve is calculated as a point R'.

Next, the pseudorandom number calculation unit 903 converts a value of an x coordinate of the point R' into an integer. The x coordinate of the point R' is a rational number.

For example, a numden( ) function implemented in MAT-LAB (registered trademark) converts a rational number into a fraction and outputs a denominator and a numerator thereof. By converting a rational number into a fraction and extracting a denominator thereof in a manner, for example, of the numden( ) function, it is possible to convert a value of an x coordinate of the point R into an integer. Then, a remainder of the number of records p is calculated from the acquired integer that is a pseudorandom number (S1208). This remainder becomes a label, that is, a record number indicating a record of the public key sub-table 604, the encrypted parameter table 609, and the public key table 618.

Next, the pseudorandom number calculation unit 903 increments the number of steps t by one (S1209). Then, a value acquired by inversion of a sign of a value in a y axis of the point R' is defined as R that is mapping of the point R'. Coordinate information of this point R is assigned to the point Q (S1210). Then, the series of processing is repeated from Step S1207.

In FIG. 12, a flow of the operation of the pseudorandom number calculation unit 903 of the controller 104 which unit is a master is illustrated. However, when receiving the initial values 904 from the date and time information generation unit 611 of the controller 104 at the time of Step S1204, the pseudorandom number calculation unit 903 of the input device 102 and the pseudorandom number calculation unit 903 of the plant-side control device 103 which units are slaves execute the operation in and after Step S1205. That is, the operations of the pseudorandom number calculation units 903 in and after Step S1205 are the same in both the master and the slave.

[Synchronized Operation Processing]

Figure 13:
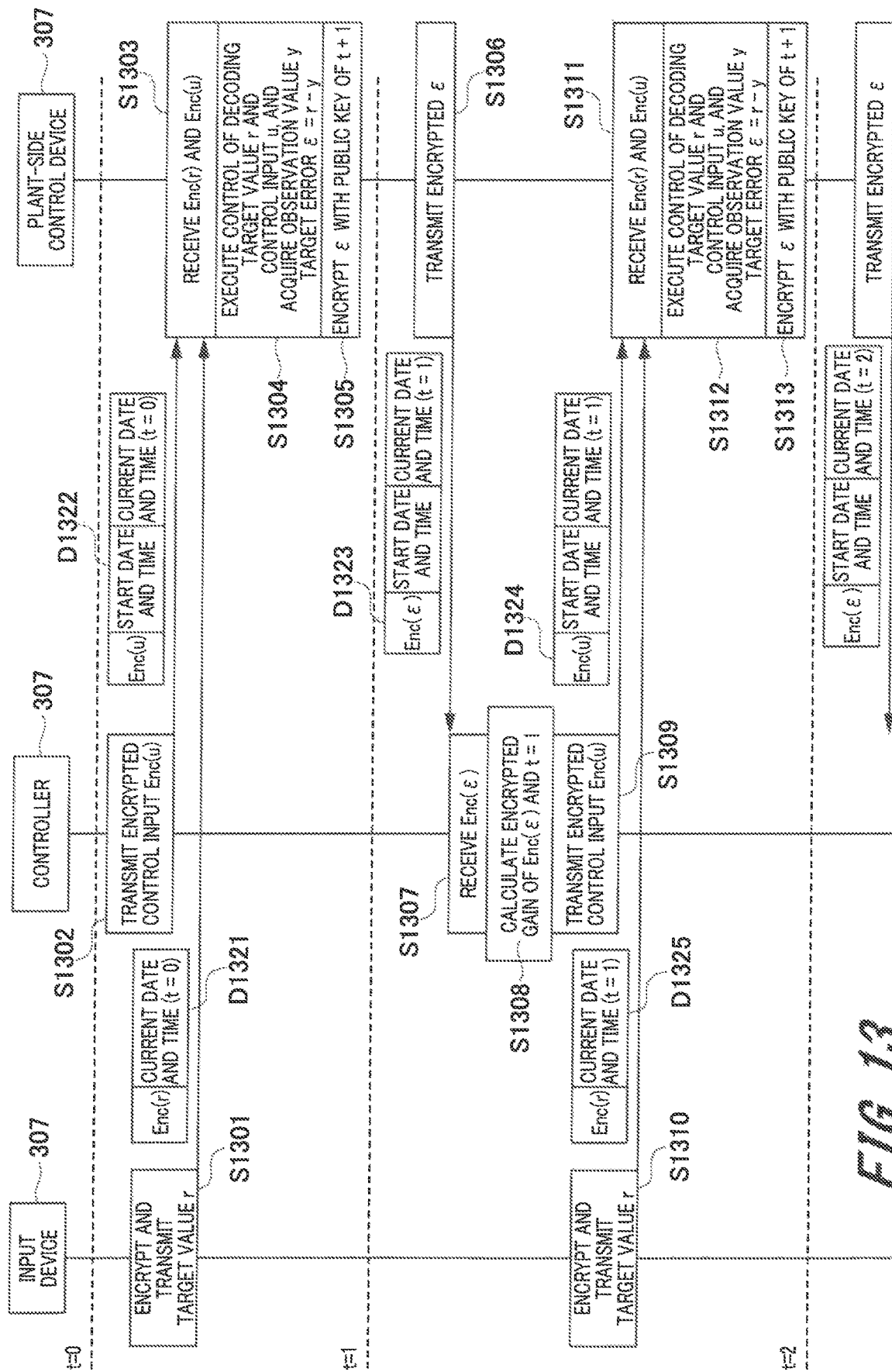
FIG. 13 is a time chart for describing a synchronized operation of the encrypted control system.

FIG. 13 is a time chart for describing the synchronized operation of the encrypted control system 101. In FIG. 13, step time is 10 msec, and the number of steps is t. t=0 at a start of synchronized operation, and t is incremented by one after t=0.

At the start of the synchronized operation (t=0), the input device 102 encrypts a target value r by a public key corresponding to a label of t=0 and acquires an encrypted target value Enc(r). Then, the encrypted target value Enc(r) is transmitted to the plant-side control device 103 via the controller 104 (S1301). A data frame D1321 of the encrypted target value Enc(r) includes current date and time information at t=0 which information is generated by the date and time information generation unit 606.

At the start of the synchronized operation (t=0), the controller 104 acquires an encrypted control input Enc(u) by reading an encrypted first parameter, an encrypted second parameter, and an encrypted third parameter corresponding to the label of t=0 from the encrypted parameter table 609, and performing multiplication processing thereof by a control input u as an initial value 904 in the multiplication unit 608. Then, the encrypted control input Enc(u) is transmitted to the plant-side control device 103 (S1302). A data frame D1322 of the encrypted control input Enc(u) includes start date and time information 901 at the start of the synchronized operation and current date and time information at t=0. At this point, the start date and time information 901 and the current date and time information are the same.

At the start of the synchronized operation (t=0), the plant-side control device 103 receives the encrypted target value Enc(r) from the input device 102 via the controller 104, and receives the encrypted control input Enc(u) from the controller 104 (S1303).

Next, the decryption processing unit 612 of the plant-side control device 103 calculates a label on the basis of current date and time information and the start date and time information 901 assigned to each data frame and decodes the target value r and the control input u by using a cipher key corresponding to the calculated label. The control arithmetic processing unit 614 performs arithmetic processing on values to be bases of the target value r and the control input u decoded by the decryption processing unit 612 and generates the target value r and the control input u. In public key encryption that has homomorphism and is used in the embodiment of the present invention, pieces of encrypted data can be multiplied (divided) by each other, but cannot be added to (subtracted from) each other. Thus, with respect to the given data, the multiplication unit 608 of the controller 104 performs only multiplication processing in control arithmetic processing. Then, the control arithmetic processing unit 614 performs addition processing that cannot be performed when encryption is performed, whereby the control arithmetic processing is completed. The control processing unit 615 generates a control signal from the control input u and controls the object to be controlled 106. When the object to be controlled 106 is controlled by the control processing unit 615, an operation of the object to be controlled 106 is detected by the sensor 107.

An observation signal output from the sensor 107 is converted into an observation value y by a signal conversion processing unit 616. The observation value y output from the signal conversion processing unit 616 is input into a target error arithmetic processing unit 617 together with the target value r output from the control arithmetic processing unit 614. The target error arithmetic processing unit 617 subtracts the observation value y from the target value r and outputs a target error ε (S1304).

The encryption processing unit 603 encrypts the target error ε with a public key that corresponds to a label corresponding to the number of steps at t+1 (S1305). Since t=0 at this time, a public key that corresponds to a label corresponding to t+1=1, that is, the number of steps 1 is used for encryption of the target error ε.

At a time point of t=1 at which the number of steps is incremented by one from the start of the synchronized operation, the plant-side control device 103 transmits an encrypted target error Enc(ε) to the controller 104 through the transmission unit 208 of the second control network module 115 (S1306). A data frame D1323 of the encrypted target error Enc(ε) includes the start date and time information 901 at the start of the synchronized operation and current date and time information at t=1.

At a time point of t=1, the controller 104 receives the encrypted target error Enc(ε) from the plant-side control device 103 (S1307). The encrypted target error Enc(ε) received from the reception unit 309 of the second control network module 115 of the controller 104 is delivered to the multiplication unit 608 through the input/output control unit 607. The multiplication unit 608 delivers the start date and time information 901 and the current date and time information at t=1 which pieces of information are assigned to the data frame of the encrypted target error Enc(ε) to the table record selection processing unit 610. The table record selection processing unit 610 reads an encrypted first parameter, an encrypted second parameter, and an encrypted third parameter corresponding to the label of t=1, and performs delivery thereof to the multiplication unit 608. The multiplication unit 608 performs multiplication processing of the encrypted first parameter, the encrypted second parameter, and the encrypted third parameter by the encrypted target error Enc(ε) and acquires an encrypted control input Enc(u) (S1308). Then, the encrypted control input Enc(u) is transmitted to the plant-side control device 103 (S1309). A data frame D1324 of the encrypted control input Enc(u) includes the start date and time information 901 at the start of the synchronized operation and the current date and time information at t=1.

At the time point of t=1, the input device 102 encrypts the target value r with a public key corresponding to the label of t=1 and acquires an encrypted target value Enc(r). Then, the encrypted target value Enc(r) is transmitted to the plant-side control device 103 via the controller 104 (S1310). A data frame D1325 of the encrypted target value Enc(r) includes the current date and time information at t=1.

At the time point of t=1, the plant-side control device 103 receives the encrypted target value Enc(r) from the input device 102 via the controller 104, and receives the encrypted control input Enc(u) from the controller 104 (S1311).

Next, the decryption processing unit 612 of the plant-side control device 103 calculates a label on the basis of current date and time information and the start date and time information 901 assigned to each data frame and decodes the target value r and the control input u by using a cipher key corresponding to the calculated label. The control arithmetic processing unit 614 performs arithmetic processing on values to be bases of the target value r and the control input u decoded by the decryption processing unit 612 and generates the target value r and the control input u. The control processing unit 615 generates a control signal from the control input u and controls the object to be controlled 106. When the object to be controlled 106 is controlled by the control processing unit 615, an operation of the object to be controlled 106 is detected by the sensor 107.

An observation signal output from the sensor 107 is converted into an observation value y by a signal conversion processing unit 616. The observation value y output from the signal conversion processing unit 616 is input into a target error arithmetic processing unit 617 together with the target value r output from the control arithmetic processing unit 614. The target error arithmetic processing unit 617 subtracts the observation value y from the target value r and outputs a target error ε (S1312).

The encryption processing unit 603 encrypts the target error ε with a public key that corresponds to a label corresponding to the number of steps at t+1 (S1313). Since t=1 at this time point, a public key that corresponds to a label corresponding to t+1=2, that is, the number of steps 2 is used for encryption of the target error ε.

Similarly, when receiving an encrypted target value Enc(r) at the number of steps t from the input device 102 and an encrypted control input Enc(u) at the number of steps t from the controller 104, the plant-side control device 103 controls the object to be controlled 106 on the basis of a target value r and a control input u. As a result, a target error ε is acquired by subtraction of an observation value y acquired from the sensor 107 from the target value r. The encryption processing unit 603 encrypts the target error ε with a public key at the number of steps t+1, and outputs the encrypted target error Enc(ε) to the controller 104.

That is, in a cycle of data reception, calculation, and data transmission of the plant-side control device 103, the number of steps is incremented by one.

On the other hand, the controller 104 acquires an encrypted control input Enc(u) by performing multiplication processing of an encrypted first parameter, an encrypted second parameter, and an encrypted third parameter at the number of steps t by the encrypted target error Enc(ε) and transmits the input to the plant-side control device 103, the parameters being acquired from current date and time information and the start date and time information 901 that are assigned to a data frame of the encrypted target error Enc(ε) received from the plant-side control device 103.

That is, in a cycle of data reception, calculation, and data transmission of the controller 104, the number of steps does not change.

[Numerical Simulation]

Numerical simulation is performed on a computer for theoretical validation of the encrypted control system 101 according to the embodiment described above.

Figure 14A:
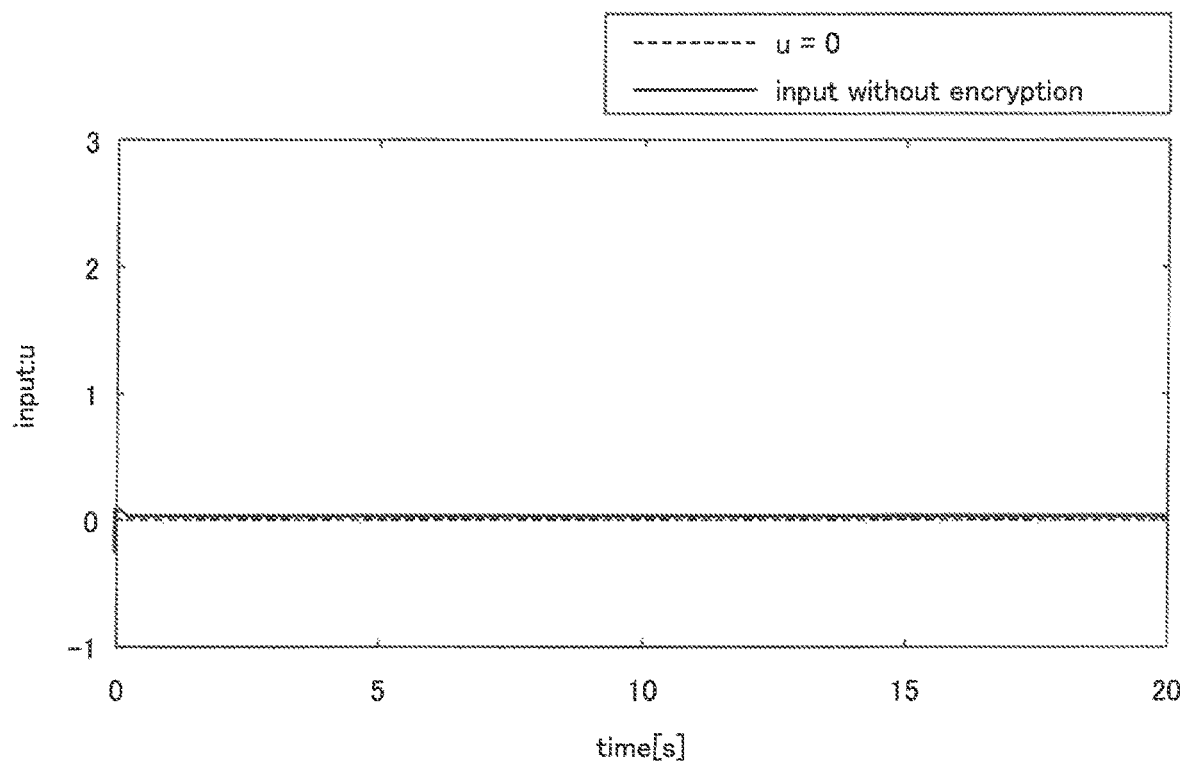
FIG. 14 is a graph of a control input u and a target error ε in each of the encrypted control system according to Patent Literature 1 and the encrypted control system according to the embodiment of the present invention.

FIG. 14A is a graph of a control input u and a target error ε in an encrypted control system 101 according to Patent Literature 1.

Figure 14B:
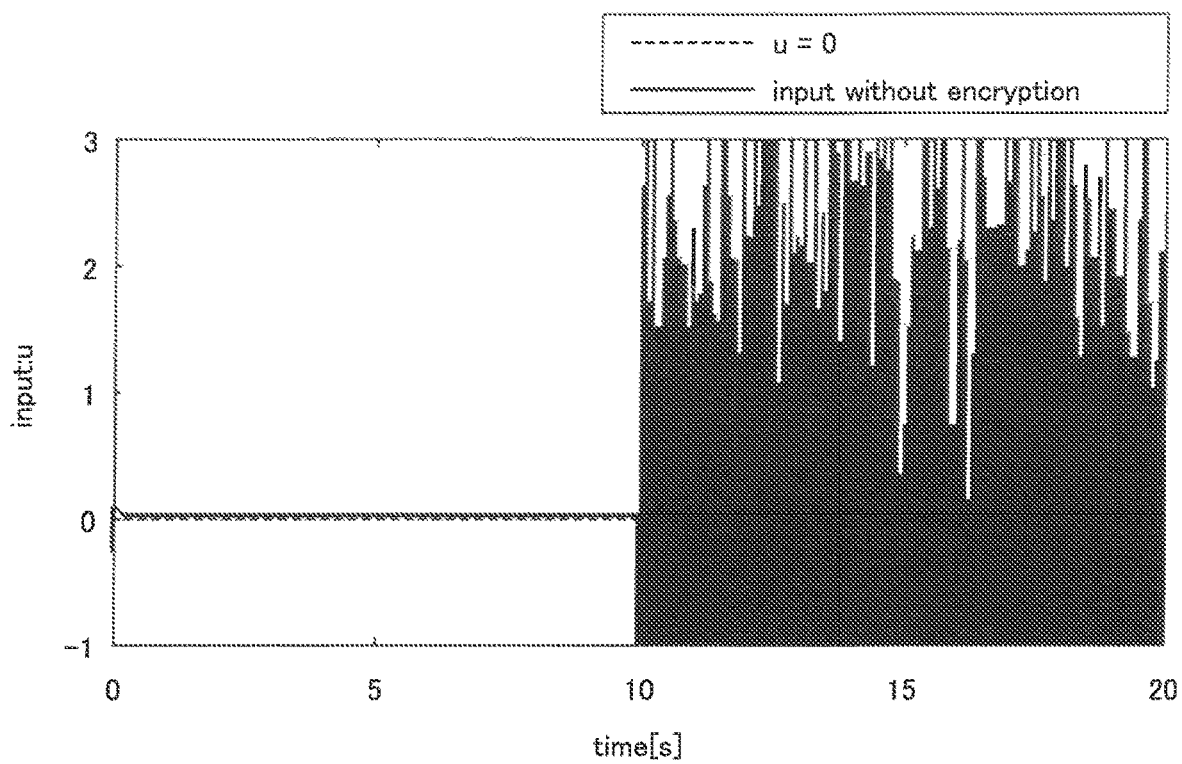

FIG. 14B is a graph of a control input u and a target error ε in the encrypted control system 101 according to the embodiment of the present invention.

Both graphs in FIG. 14A and FIG. 14B are simulation results on the assumption that a falsification attack is performed on an encrypted target error Enc(ε) at time of 10 sec with step time being 10 msec.

In FIG. 14A, since only one pair of a public key and a private key is used, an influence of the falsification attack does not appear on the target error ε. However, since a mechanism in which a pair of a public key and a private key to be used is randomly switched in each number of steps is employed, discontinuous changes that are clearly different from that before the falsification attack is performed on the target error ε is shown due to the falsification attack in FIG. 14B.

It is preferable that the object to be controlled 106 is in a stable state in the control system. For this reason, it is unlikely that the target error ε fluctuates significantly. Thus, a fluctuation range of the target error ε is generally small and has continuity. When a signal having a small fluctuation range and having continuity in a normal state suddenly shows an increase in a fluctuation range and discontinuous changes, it can be definitely recognized that some kind of abnormality is generated.

For example, when the fluctuation range of the target error ε is squared, compared with a predetermined threshold, and is larger than the threshold, it can be determined that there is an attack on the encrypted control system 101. This determination calculation is assumed as an attack detector.

Figure 15A:
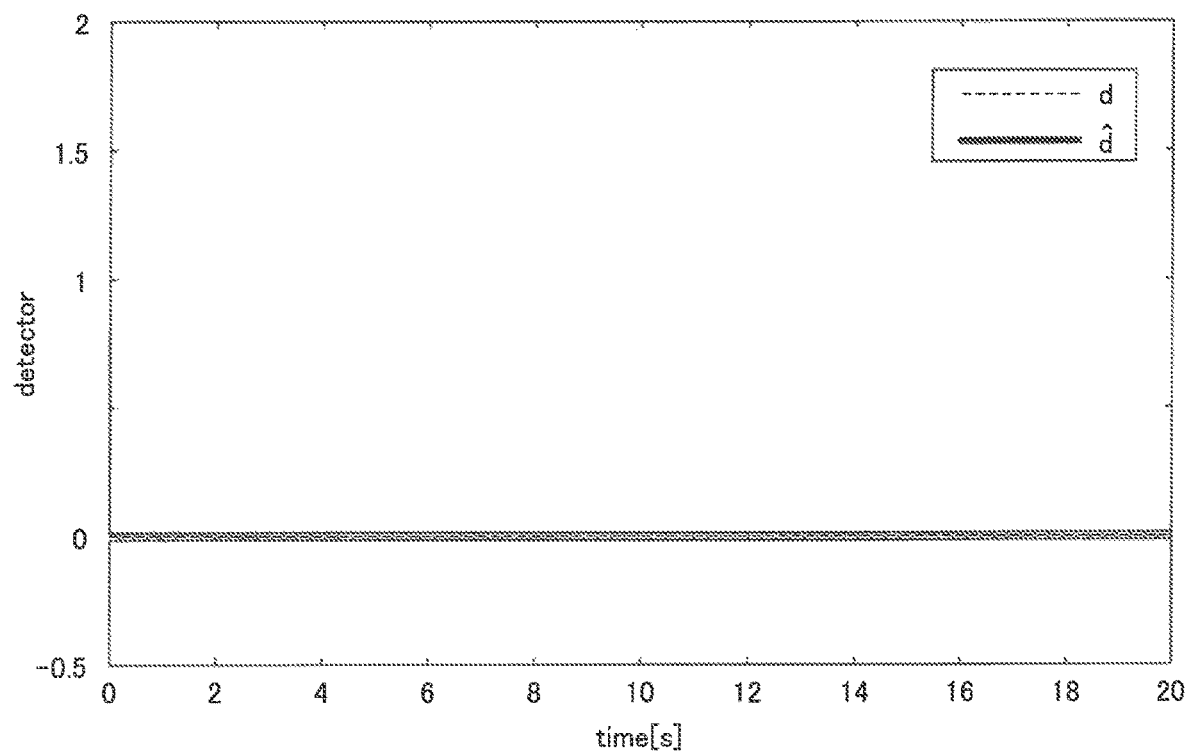
FIG. 15 is a graph of an attack detector in each of the encrypted control system according to Patent Literature 1 and the encrypted control system according to the embodiment of the present invention.

FIG. 15A is a graph of an attack detector in the encrypted control system 101 according to Patent Literature 1.

Figure 15B:
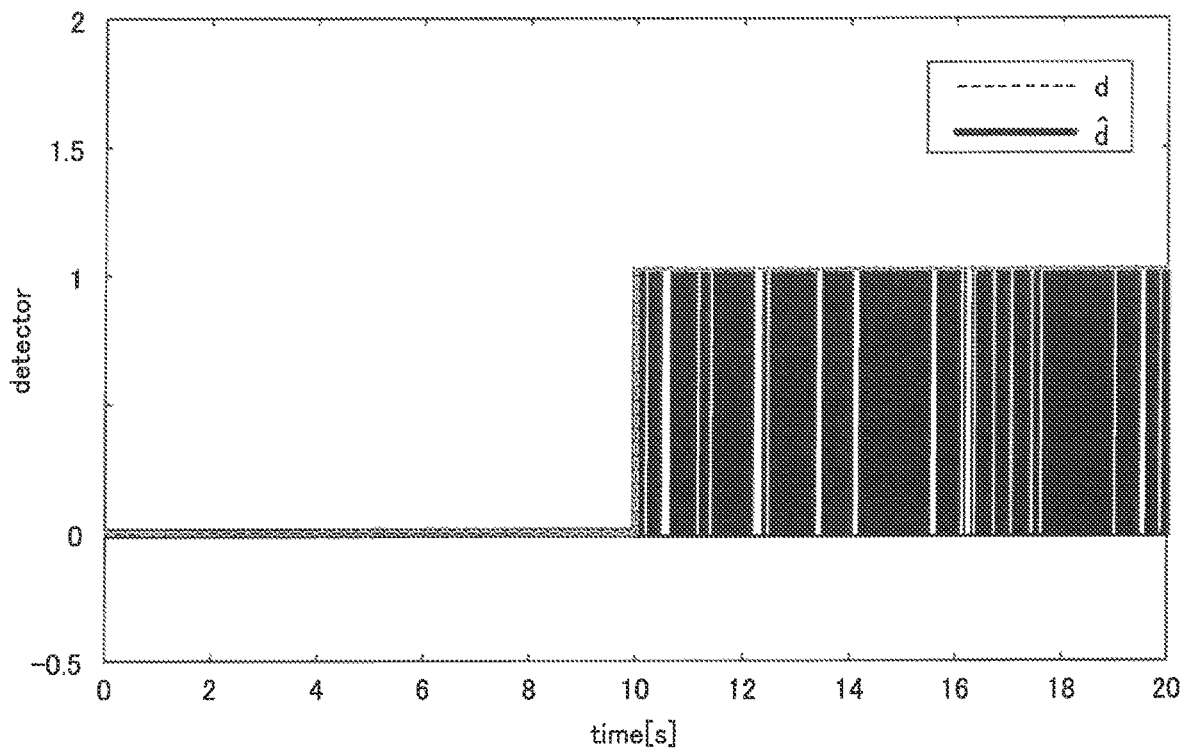

FIG. 15B is a graph of an attack detector in the encrypted control system 101 according to the embodiment of the present invention.

In FIG. 15A, the attack detector cannot detect a falsification attack since only one pair of a public key and a private key is used. However, in FIG. 15B, since a mechanism in which a pair of a public key and a private key to be used is randomly switched for each number of steps is employed, the attack detector can definitely recognize that a target error ε receives a falsification attack.

Modification examples in the following manner are conceivable in the embodiment described above.

(1) In the above embodiment, a pseudorandom number calculation unit 903 is configured to operate at a time point at which a calculation request is generated. However, a result of calculation may be previously stored in a label table.

The label table has a step number field and a label field.

The step number field stores the number of steps.

A label that is calculated by a pseudorandom number calculation unit 903 and that corresponds to the number of steps is stored in the label field.

When about a several thousands or a several tens of thousands of records of such label tables are stored, a calculation resource of a CPU module 112 can be concentrated on main control calculation.

(2) In the above embodiment, it is configured that a pair of a public key and a private key is switched in each control cycle. However, it may be configured that switching is performed in every plurality of control cycles. However, when the switching cycle is too long, vulnerability to a malicious third party may be increased.

(3) A function of a date and time information source device 105 may be shared by any one of an input device 102, a plant-side control device 103, and a controller 104. For example, when an input device 102 is equipped with a global positioning system (GPS) receiver, accurate date and time information can be acquired.

(4) An input device 102 and a controller 104 can be integrated.

Figure 16:
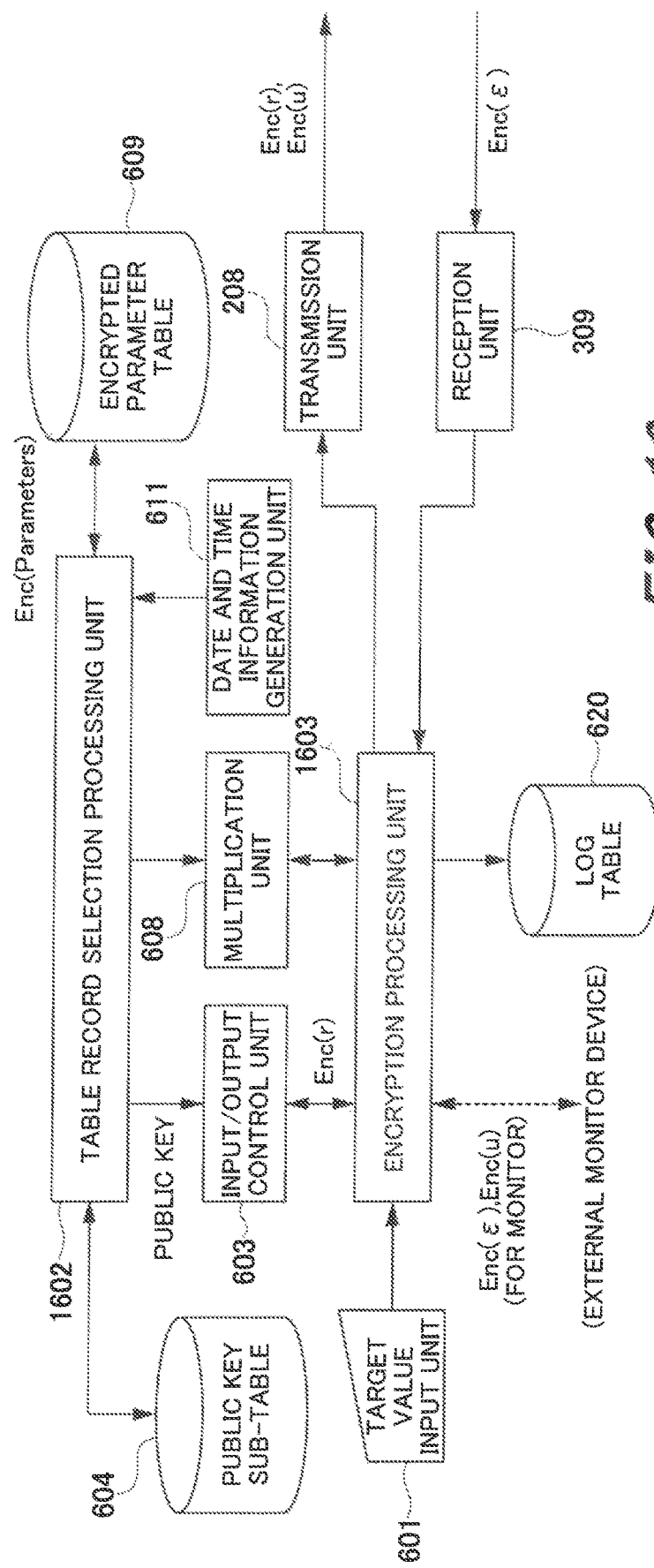
FIG. 16 is a block diagram illustrating a software function, in a control network, of a controller according to a modification example of the embodiment of the present invention.

FIG. 16 is a block diagram illustrating a software function, in a control network, of a controller 1601 according to a modification example of the embodiment of the present invention.

The controller 1601 illustrated in FIG. 16 has a configuration in which an input device 102 and a controller 104 illustrated in FIG. 6 are integrated.

First, a table record selection processing unit 1602 has functions of a table record selection processing unit 605 of the input device 102 and a table record selection processing unit 610 of the controller 104. That is, the table record selection processing unit 1602 has a function of selecting a predetermined record from a public key sub-table 604 and selecting a predetermined record from an encrypted parameter table 609 for an encryption processing unit 603.

Next, an input/output control unit 1603 has functions of an input/output control unit 602 of the input device 102 and an input/output control unit 607 of the controller 104.

Then, a date and time information generation unit 606 of the input device 102 is omitted. That is, a date and time information generation unit 611 has a function of providing date and time information added to an encrypted control input output from the multiplication unit 603, and providing date and time information and giving start timing to the table record selection processing unit 1602.

As described above, in the encrypted control system 101, an equivalent function can be realized even when the controller 1601 in which the input device 102 and the controller 104 are integrated is used instead of the input device 102 and the controller 104.

Note that the input device 102 in FIG. 6 has a public key sub-table 604. Thus, when the controller 1601 in which the input device 102 and the controller 104 are integrated is realized, when not only a target value r but also a first parameter Kp, a second parameter Ki, and a third parameter Kd are encrypted by the encryption processing unit 603, the encrypted parameter table 609 can be omitted although the amount of calculation by the encryption processing unit 603 is increased.

In the present embodiment, the encrypted control system 101 is disclosed.

The input device 102, the plant-side control device 103, and the controller 104 are equipped with pseudorandom number calculation units 903 having a common function, and time synchronization is performed. Then, a synchronized operation is started at the same time. When the encrypted control system 101 is configured in such a manner, it becomes possible to switch a pair of a public key and a private key in synchronization with a control cycle of the entire control system. Consequently, it becomes possible to instantaneously and definitely detect intervention in the control system by a malicious third party.

In the above, an embodiment of the present invention has been described. However, the present invention is not limited to the above embodiment, and a different modification example and application example are included within the spirit of the present invention described in claims.

REFERENCE SIGNS LIST

101 . . . encrypted control system, 102 . . . input device, 103 . . . plant-side control device, 104 . . . controller, 105 . . . date and time information source device, 106 . . . object to be controlled, 107 . . . sensor, 111 . . . mount base, 112 . . . CPU module, 113 . . . information network module, 114a and 114b . . . first control network module, 115 . . . second control network module, 116 . . . input/output module, 201 . . . module bus, 202 . . . CPU, 203 . . . ROM, 204 . . . RAM, 205 . . . RTC, 206 . . . internal bus, 207 . . . NIC, 208 . . . transmission unit, 309 . . . reception unit, 410 . . . A/D converter, 411 . . . D/A converter, 501 . . . CPU, 502 . . . ROM, 503 . . . RAM, 504 . . . non-volatile storage, 505 . . . RTC, 506 . . . NIC, 507 . . . bus, 508 . . . display unit, 509 . . . operation unit, 601 . . . target value input unit, 602 . . . input/output control unit, 603 . . . encryption processing unit, 604 . . . public key sub-table, 605 . . . table record selection processing unit, 606 . . . date and time information generation unit, 607 . . . input/output control unit, 608 . . . multiplication unit, 609 . . . encrypted parameter table, 610 . . . table record selection processing unit, 611 . . . date and time information generation unit, 612 . . . decryption processing unit, 613 . . . table record selection processing unit, 614 . . . control arithmetic processing unit, 615 . . . control processing unit, 616 . . . signal conversion processing unit, 617 . . . target error arithmetic processing unit, 618 . . . public key table, 619 . . . date and time information generation unit, 620 . . . log table, 901 . . . start date and time information, 902 . . . step number calculation unit, 903 . . . pseudorandom number calculation unit, 904 . . . initial value, 1601 . . . controller, 1602 . . . table record selection processing unit, and 1603 . . . input/output control unit.

The invention claimed is:

1. An encrypted control method comprising:
an encrypted target value receiving step of receiving, from an input device, a first data frame including an encrypted target value;
an encrypted target value step number calculating step of calculating a number of steps of the encrypted target value by reading first encode date and time information from an encode date and time field assigned to the first data frame, subtracting start date and time information from the first encode date and time information, and performing division thereof by a predetermined cycle; and
an encrypted target value decrypting step of calculating a first pseudorandom number on the basis of the number of steps of the encrypted target value, designating a record number in a public key table, in which a plurality of public keys and private keys paired with the public keys are stored, on the basis of the first pseudorandom number, and decrypting the encrypted target value with a private key stored in a selected record.

2. The encrypted control method according to claim 1, further comprising
- an encrypted parameter receiving step of receiving, from a controller, a second data frame including an encrypted parameter,
- an encrypted parameter step number calculating step of calculating a number of steps of the encrypted parameter by reading second encode date and time information from an encode date and time field assigned to the second data frame, subtracting start date and time information from the second encode date and time information, and performing division thereof by a predetermined cycle,
- an encrypted parameter decrypting step of calculating a second pseudorandom number on the basis of the number of steps of the encrypted parameter, designating a record number in the public key table on the basis of the second pseudorandom number, and decrypting the encrypted parameter with a private key stored in a selected record,
- a control arithmetic processing step of acquiring a control input by performing predetermined arithmetic processing on a value of the encrypted parameter decrypted in the encrypted parameter decrypting step,
- a target error arithmetic processing step of controlling an object to be controlled on the basis of the control input, and acquiring a target error by subtracting, from the target value, an observation value acquired from a sensor that observes the object to be controlled,
- a target error encryption processing step of calculating a third pseudorandom number on the basis of a new number of steps acquired by addition of 1 to the number of steps of the encrypted parameter calculated in the encrypted parameter step number calculating step, designating a record number in the public key table on the basis of the third pseudorandom number, and encrypting the target error with a public key stored in a selected record, and
- an encrypted target error transmitting step of adding an encode date and time field storing current date and time information and a start date and time field storing start date and time information to the target error, and transmitting a third data frame to the controller.

3. A non-transitory computer-readable medium storing thereon an encrypted control program causing a computer to execute
- an encrypted target value receiving step of receiving, from an input device, a first data frame including an encrypted target value,
- an encrypted target value step number calculating step of calculating a number of steps of the encrypted target value by reading first encode date and time information from an encode date and time field assigned to the first data frame, subtracting start date and time information from the first encode date and time information, and performing division thereof by a predetermined cycle, and
- an encrypted target value decrypting step of calculating a first pseudorandom number on the basis of the number of steps of the encrypted target value, designating a record number in a public key table, in which a plurality of public keys and private keys paired with the public keys are stored, on the basis of the first pseudorandom number, and decrypting the encrypted target value with a private key stored in a selected record.

4. The non-transitory computer-readable medium according to claim 3, causing the computer to further execute
- an encrypted parameter receiving step of receiving, from a controller, a second data frame including an encrypted parameter,
- an encrypted parameter step number calculating step of calculating a number of steps of the encrypted parameter by reading second encode date and time information from an encode date and time field assigned to the second data frame, subtracting start date and time information from the second encode date and time information, and performing division thereof by a predetermined cycle,
- an encrypted parameter decrypting step of calculating a second pseudorandom number on the basis of the number of steps of the encrypted parameter, designating a record number in the public key table on the basis of the second pseudorandom number, and decrypting the encrypted parameter with a private key stored in a selected record,
- a control arithmetic processing step of acquiring a control input by performing predetermined arithmetic processing on a value of the encrypted parameter decrypted in the encrypted parameter decrypting step,
- a target error arithmetic processing step of controlling an object to be controlled on the basis of the control input, and acquiring a target error by subtracting, from the target value, an observation value acquired from a sensor that observes the object to be controlled,
- a target error encryption processing step of calculating a third pseudorandom number on the basis of a new number of steps acquired by addition of 1 to the number of steps of the encrypted parameter which number is calculated in the encrypted parameter step number calculating step, designating a record number in the public key table on the basis of the third pseudorandom number, and encrypting the target error with a public key stored in a selected record, and
- an encrypted target error transmitting step of adding an encode date and time field storing current date and time information and a start date and time field storing start date and time information to the target error, and transmitting a third data frame to the controller.

* * * * *